US011304019B2

(12) United States Patent
Shlomot et al.

(10) Patent No.: US 11,304,019 B2
(45) Date of Patent: Apr. 12, 2022

(54) DELAY ESTIMATION METHOD AND APPARATUS

(71) Applicant: Huawei Technologies Co., Ltd., Shenzhen (CN)

(72) Inventors: Eyal Shlomot, Long Beach, CA (US); Halting Li, Beijing (CN); Lei Miao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 16/727,652

(22) Filed: Dec. 26, 2019

(65) Prior Publication Data

US 2020/0137504 A1 Apr. 30, 2020

Related U.S. Application Data

(63) Continuation of application No. PCT/CN2018/090631, filed on Jun. 11, 2018.

(30) Foreign Application Priority Data

Jun. 29, 2017 (CN) ......................... 201710515887.1

(51) Int. Cl.

*G06F 17/00* (2019.01)
*H04S 1/00* (2006.01)
*H04S 5/00* (2006.01)

(52) U.S. Cl.

CPC ................ *H04S 1/007* (2013.01); *H04S 5/00* (2013.01); *H04S 2400/03* (2013.01); *H04S 2400/05* (2013.01)

(58) Field of Classification Search

CPC ........ H04S 1/007; H04S 5/00; H04S 2400/03; H04S 2400/05

(Continued)

(56) References Cited

U.S. PATENT DOCUMENTS

2003/0219130 A1 11/2003 Baumgarte et al.
2005/0004791 A1 1/2005 Van De Kerkhof et al.

(Continued)

FOREIGN PATENT DOCUMENTS

CN 1965351 A 5/2007
CN 101809655 A 8/2010

(Continued)

OTHER PUBLICATIONS

Faller: Improved Time Delay Analysis/Synthesis for Parametric Stereo Audio Coding (Year: 2006).*

(Continued)

*Primary Examiner* — Paul C McCord
(74) *Attorney, Agent, or Firm* — Conley Rose, P.C.

(57) ABSTRACT

A delay estimation method includes determining a cross-correlation coefficient of a multi-channel signal of a current frame, determining a delay track estimation value of the current frame based on buffered inter-channel time difference information of at least one past frame, determining an adaptive window function of the current frame, performing weighting on the cross-correlation coefficient based on the delay track estimation value of the current frame and the adaptive window function of the current frame, to obtain a weighted cross-correlation coefficient, and determining an inter-channel time difference of the current frame based on the weighted cross-correlation coefficient.

22 Claims, 8 Drawing Sheets

(58) Field of Classification Search
USPC ........................................................ 700/94
See application file for complete search history.

(56) References Cited

U.S. PATENT DOCUMENTS

| | | | |
|---|---|---|---|
| 2005/0065786 | A1 | 3/2005 | Stachurski et al. |
| 2009/0119111 | A1 | 5/2009 | Goto et al. |
| 2011/0301962 | A1 | 12/2011 | Wu et al. |
| 2011/0320212 | A1 | 12/2011 | Tsujino et al. |
| 2012/0033770 | A1 | 2/2012 | Zhang et al. |
| 2012/0281841 | A1 | 11/2012 | Kim et al. |
| 2012/0300945 | A1 | 11/2012 | Wu et al. |
| 2013/0094654 | A1 | 4/2013 | Breebaart et al. |
| 2013/0282384 | A1 | 10/2013 | Gibbs |
| 2013/0301835 | A1 | 11/2013 | Briand et al. |
| 2017/0061972 | A1 | 3/2017 | Briand et al. |
| 2017/0229126 | A1 | 8/2017 | Purnhagen et al. |
| 2017/0365265 | A1 | 12/2017 | Zhang et al. |
| 2017/0372710 | A1 | 12/2017 | Zhang et al. |
| 2020/0137504 | A1 | 4/2020 | Shlomot et al. |
| 2020/0286495 | A1* | 9/2020 | Norvell ............... G10L 21/0308 |

FOREIGN PATENT DOCUMENTS

| | | | |
|---|---|---|---|
| CN | 102292769 | A | 12/2011 |
| CN | 102074236 | B | 6/2012 |
| CN | 102687405 | A | 9/2012 |
| CN | 103366748 | A | 10/2013 |
| CN | 103700372 | A | 4/2014 |
| CN | 103403800 | B | 6/2015 |
| CN | 106209491 | A | 12/2016 |
| CN | 106814350 | A | 6/2017 |
| EP | 2138999 | A1 | 12/2009 |
| KR | 101038574 | B1 | 6/2011 |
| KR | 20130023023 | A | 3/2013 |
| KR | 102299938 | B1 | 9/2021 |
| RU | 2482554 | C1 | 5/2013 |
| WO | 2006089570 | A1 | 8/2006 |
| WO | 2007052612 | A1 | 5/2007 |
| WO | 2016141731 | A1 | 9/2016 |
| WO | 2016141732 | A1 | 9/2016 |

OTHER PUBLICATIONS

Machine Translation and Abstract of Chinese Publication No. CN103366748, Oct. 23, 2013, 27 pages.

Machine Translation and Abstract of Chinese Publication No. CN103700372, Apr. 2, 2014, 17 pages.

Machine Translation and Abstract of Chinese Publication No. CN106209491, Dec. 7, 2016, 19 pages.

Machine Translation and Abstract of Chinese Publication No. CN106814350, Jun. 9, 2017, 15 pages.

"3rd Generation Partnership Project; Technical Specification Group Services and System Aspects; Virtual Reality (VR) media services over 3GPP (Release 15)," 3GPP TR 26.918 V1.0.0, Jun. 2017, 60 pages.

TSG SA WG4, "Presentation of TR 26.918 Virtual Reality (VR) media services over 3GPP; (Release 14) Version 1.0.0," 3GPP TSG-SA Meeting #76, Tdoc SP-170331, West Palm Beach, US, Jun. 7-9, 2017, 1 page.

Foreign Communication From A Counterpart Application, Taiwanese Application No. 10820027460, Taiwanese Office Action dated Jan. 10, 2020, 4 pages.

Foreign Communication From A Counterpart Application, PCT Application No. PCT/CN2018/090631, English Translation of International Search Report dated Aug. 24, 2018, 2 pages.

Foreign Communication From A Counterpart Application, PCT Application No. PCT/CN2018/090631, English Translation of Written Opinion dated Aug. 24, 2018, 6 pages.

Bertrand Fatus, Master Thesis : Parametric Coding for Spatial Audio. KTH, Stockholm, Sweden, Jul.-Dec. 2015, 70 pages.

* cited by examiner

DELAY ESTIMATION METHOD AND APPARATUS

CROSS-REFERENCE TO RELATED APPLICATIONS

This application is a continuation of International Patent Application No. PCT/CN2018/090631, filed on Jun. 11, 2018, which claims priority to Chinese Patent Application No. 201710515887.1, filed on Jun. 29, 2017. The disclosures of the aforementioned applications are hereby incorporated by reference in their entireties.

TECHNICAL FIELD

This application relates to the audio processing field, and in particular, to a delay estimation method and apparatus.

BACKGROUND

Compared with a mono signal, thanks to directionality and spaciousness, a multi-channel signal (such as a stereo signal) is favored by people. The multi-channel signal includes at least two mono signals. For example, the stereo signal includes two mono signals, namely, a left channel signal and a right channel signal. Encoding the stereo signal may be performing time-domain downmixing processing on the left channel signal and the right channel signal of the stereo signal to obtain two signals, and then encoding the obtained two signals. The two signals are a primary channel signal and a secondary channel signal. The primary channel signal is used to represent information about correlation between the two mono signals of the stereo signal. The secondary channel signal is used to represent information about a difference between the two mono signals of the stereo signal.

A smaller delay between the two mono signals indicates a stronger primary channel signal, higher coding efficiency of the stereo signal, and better encoding and decoding quality. On the contrary, a greater delay between the two mono signals indicates a stronger secondary channel signal, lower coding efficiency of the stereo signal, and worse encoding and decoding quality. To ensure a better effect of a stereo signal obtained through encoding and decoding, the delay between the two mono signals of the stereo signal, namely, an inter-channel time difference (ITD), needs to be estimated. The two mono signals are aligned by performing delay alignment processing is performed based on the estimated inter-channel time difference, and this enhances the primary channel signal.

A typical time-domain delay estimation method includes performing smoothing processing on a cross-correlation coefficient of a stereo signal of a current frame based on a cross-correlation coefficient of at least one past frame, to obtain a smoothed cross-correlation coefficient, searching the smoothed cross-correlation coefficient for a maximum value, and determining an index value corresponding to the maximum value as an inter-channel time difference of the current frame. A smoothing factor of the current frame is a value obtained through adaptive adjustment based on energy of an input signal or another feature. The cross-correlation coefficient is used to indicate a degree of cross correlation between two mono signals after delays corresponding to different inter-channel time differences are adjusted. The cross-correlation coefficient may also be referred to as a cross-correlation function.

A uniform standard (the smoothing factor of the current frame) is used for an audio coding device, to smooth all cross-correlation values of the current frame. This may cause some cross-correlation values to be excessively smoothed, and/or cause other cross-correlation values to be insufficiently smoothed.

SUMMARY

To resolve a problem that an inter-channel time difference estimated by an audio coding device is inaccurate due to excessive smoothing or insufficient smoothing performed on a cross-correlation value of a cross-correlation coefficient of a current frame by the audio coding device, embodiments of this application provide a delay estimation method and apparatus.

According to a first aspect, a delay estimation method is provided. The method includes determining a cross-correlation coefficient of a multi-channel signal of a current frame, determining a delay track estimation value of the current frame based on buffered inter-channel time difference information of at least one past frame, determining an adaptive window function of the current frame, performing weighting on the cross-correlation coefficient based on the delay track estimation value of the current frame and the adaptive window function of the current frame, to obtain a weighted cross-correlation coefficient, and determining an inter-channel time difference of the current frame based on the weighted cross-correlation coefficient.

The inter-channel time difference of the current frame is predicted by calculating the delay track estimation value of the current frame, and weighting is performed on the cross-correlation coefficient based on the delay track estimation value of the current frame and the adaptive window function of the current frame. The adaptive window function is a raised cosine-like window, and has a function of relatively enlarging a middle part and suppressing an edge part. Therefore, when weighting is performed on the cross-correlation coefficient based on the delay track estimation value of the current frame and the adaptive window function of the current frame, if an index value is closer to the delay track estimation value, a weighting coefficient is greater, avoiding a problem that a first cross-correlation coefficient is excessively smoothed, and if the index value is farther from the delay track estimation value, the weighting coefficient is smaller, avoiding a problem that a second cross-correlation coefficient is insufficiently smoothed. In this way, the adaptive window function adaptively suppresses a cross-correlation value corresponding to the index value, away from the delay track estimation value, in the cross-correlation coefficient, thereby improving accuracy of determining the inter-channel time difference in the weighted cross-correlation coefficient. The first cross-correlation coefficient is a cross-correlation value corresponding to an index value, near the delay track estimation value, in the cross-correlation coefficient, and the second cross-correlation coefficient is a cross-correlation value corresponding to an index value, away from the delay track estimation value, in the cross-correlation coefficient.

With reference to the first aspect, in a first implementation of the first aspect, the determining an adaptive window function of the current frame includes determining the adaptive window function of the current frame based on a smoothed inter-channel time difference estimation deviation of an $(n-k)^{th}$ frame, where $0<k<n$, and the current frame is an $n^{th}$ frame.

The adaptive window function of the current frame is determined using the smoothed inter-channel time difference estimation deviation of the (n−k)$^{th}$ frame such that a shape of the adaptive window function is adjusted based on the smoothed inter-channel time difference estimation deviation, thereby avoiding a problem that a generated adaptive window function is inaccurate due to an error of the delay track estimation of the current frame, and improving accuracy of generating an adaptive window function.

With reference to the first aspect or the first implementation of the first aspect, in a second implementation of the first aspect, the determining an adaptive window function of the current frame includes calculating a first raised cosine width parameter based on a smoothed inter-channel time difference estimation deviation of a previous frame of the current frame, calculating a first raised cosine height bias based on the smoothed inter-channel time difference estimation deviation of the previous frame of the current frame, and determining the adaptive window function of the current frame based on the first raised cosine width parameter and the first raised cosine height bias.

A multi-channel signal of the previous frame of the current frame has a strong correlation with the multi-channel signal of the current frame. Therefore, the adaptive window function of the current frame is determined based on the smoothed inter-channel time difference estimation deviation of the previous frame of the current frame, thereby improving accuracy of calculating the adaptive window function of the current frame.

With reference to the second implementation of the first aspect, in a third implementation of the first aspect, a formula for calculating the first raised cosine width parameter is as follows.

$$win\_width1=TRUNC(width\_par1*(A*L\_NCSHIFT\_DS+1)), \text{ and}$$

$$width\_par1=a\_width1*smooth\_dist\_reg+b\_width1; \text{ where}$$

$$a\_width1=(xh\_width1-xl\_width1)/(yh\_dist1-yl\_dist1),$$

$$b\_width1=xh\_width1-a\_width1*yh\_dist1,$$

where win_width1 is the first raised cosine width parameter, TRUNC indicates rounding a value, L_NCSHIFT_DS is a maximum value of an absolute value of an inter-channel time difference, A is a preset constant, A is greater than or equal to 4, xh_width1 is an upper limit value of the first raised cosine width parameter, xl_width1 is a lower limit value of the first raised cosine width parameter, yh_dist1 is a smoothed inter-channel time difference estimation deviation corresponding to the upper limit value of the first raised cosine width parameter, yl_dist1 is a smoothed inter-channel time difference estimation deviation corresponding to the lower limit value of the first raised cosine width parameter, smooth_dist_reg is the smoothed inter-channel time difference estimation deviation of the previous frame of the current frame, and xh_width1, xl_width1, yh_dist1, and yl_dist1 are all positive numbers.

With reference to the third implementation of the first aspect, in a fourth implementation of the first aspect, $$width\_par1=\min(width\_par1,xh\_width1); \text{ and}$$

$$width\_par1=\max(width\_par1,xl\_width1),$$

where min represents taking of a minimum value, and max represents taking of a maximum value.

When width_par1 is greater than the upper limit value of the first raised cosine width parameter, width_par1 is limited to be the upper limit value of the first raised cosine width parameter, or when width_par1 is less than the lower limit value of the first raised cosine width parameter, width_par1 is limited to the lower limit value of the first raised cosine width parameter in order to ensure that a value of width_par1 does not exceed a normal value range of the raised cosine width parameter, thereby ensuring accuracy of a calculated adaptive window function.

With reference to any one of the second implementation to the fourth implementation of the first aspect, in a fifth implementation of the first aspect, a formula for calculating the first raised cosine height bias is as follows.

$$win\_bias1=a\_bias1*smooth\_dist\_reg+b\_bias1, \text{ where}$$

$$a\_bias1=(xh\_bias1-xl\_bias1)/(yh\_dist2-yl\_dist2), \text{ and}$$

$$b\_bias1=xh\_bias1-a\_bias1*yh\_dist2,$$

where win_bias1 is the first raised cosine height bias, xh_bias1 is an upper limit value of the first raised cosine height bias, xl_bias1 is a lower limit value of the first raised cosine height bias, yh_dist2 is a smoothed inter-channel time difference estimation deviation corresponding to the upper limit value of the first raised cosine height bias, yl_dist2 is a smoothed inter-channel time difference estimation deviation corresponding to the lower limit value of the first raised cosine height bias, smooth_dist_reg is the smoothed inter-channel time difference estimation deviation of the previous frame of the current frame, and yh_dist2, yl_dist2, xh_bias1, and xl_bias1 are all positive numbers.

With reference to the fifth implementation of the first aspect, in a sixth implementation of the first aspect, $$win\_bias1=\min(win\_bias1,xh\_bias1); \text{ and}$$

$$win\_bias1=\max(win\_bias1,xl\_bias1),$$

where min represents taking of a minimum value, and max represents taking of a maximum value.

When win_bias1 is greater than the upper limit value of the first raised cosine height bias, win_bias1 is limited to be the upper limit value of the first raised cosine height bias, or when win_bias1 is less than the lower limit value of the first raised cosine height bias, win_bias1 is limited to the lower limit value of the first raised cosine height bias in order to ensure that a value of win_bias1 does not exceed a normal value range of the raised cosine height bias, thereby ensuring accuracy of a calculated adaptive window function.

With reference to any one of the second implementation to the fifth implementation of the first aspect, in a seventh implementation of the first aspect, $$yh\_dist2=yh\_dist1, \text{ and } yl\_dist2=yl\_dist1.$$

With reference to any one of the first aspect, and the first implementation to the seventh implementation of the first aspect, in an eighth implementation of the first aspect, the following apply.

$$\text{When } 0 \le k \le TRUNC(A*L\_NCSHIFT\_DS/2)-2*win\_width1-1, loc\_weight\_win(k)=win\_bias1;$$

$$\text{when } TRUNC(A*L\_NCSHIFT\_DS/2)-2*win\_width1 \le k \le TRUNC(A*L\_NCSHIFT\_DS/2)+2*win\_width1-1,$$

$$loc\_weight\_win(k)=0.5*(1+win\_bias1)+0.5*(1-win\_bias1)*\cos(\pi*(k-TRUNC(A*L\_NCSHIFT\_DS/2))/(2*win\_width1)); \text{ and}$$

$$\text{when TRUNC}(A*L\_\text{NCSHIFT}\_DS/2)+2*\text{win\_width1}\le k\le A*L\_\text{NCSHIFT}\_DS,\ \text{loc\_weight\_win}(k)=\text{win\_bias1},$$

where loc_weight_win(k) is used to represent the adaptive window function, where k=0, 1, . . . , A*L_NCSHIFT_DS, A is the preset constant and is greater than or equal to 4, L_NCSHIFT_DS is the maximum value of the absolute value of the inter-channel time difference, win_width1 is the first raised cosine width parameter, and win_bias1 is the first raised cosine height bias.

With reference to any one of the first implementation to the eighth implementation of the first aspect, in a ninth implementation of the first aspect, after the determining an inter-channel time difference of the current frame based on the weighted cross-correlation coefficient, the method further includes calculating a smoothed inter-channel time difference estimation deviation of the current frame based on the smoothed inter-channel time difference estimation deviation of the previous frame of the current frame, the delay track estimation value of the current frame, and the inter-channel time difference of the current frame.

After the inter-channel time difference of the current frame is determined, the smoothed inter-channel time difference estimation deviation of the current frame is calculated. When an inter-channel time difference of a next frame is to be determined, the smoothed inter-channel time difference estimation deviation of the current frame can be used in order to ensure accuracy of determining the inter-channel time difference of the next frame.

With reference to the ninth implementation of the first aspect, in a tenth implementation of the first aspect, the smoothed inter-channel time difference estimation deviation of the current frame is obtained through calculation using the following calculation formulas.

$$\text{smooth\_dist\_reg\_update}=(1-\gamma)*\text{smooth\_dist\_reg}+\gamma*\text{dist\_reg}',\ \text{and}\ \text{dist\_reg}'=|\text{reg\_prv\_corr}-\text{cur\_itd}|,$$

where smooth_dist_reg_update is the smoothed inter-channel time difference estimation deviation of the current frame, $\gamma$ is a first smoothing factor, and $0<\gamma<1$, smooth_dist_reg is the smoothed inter-channel time difference estimation deviation of the previous frame of the current frame, reg_prv_corr is the delay track estimation value of the current frame, and cur_itd is the inter-channel time difference of the current frame.

With reference to the first aspect, in an eleventh implementation of the first aspect, an initial value of the inter-channel time difference of the current frame is determined based on the cross-correlation coefficient, the inter-channel time difference estimation deviation of the current frame is calculated based on the delay track estimation value of the current frame and the initial value of the inter-channel time difference of the current frame, and the adaptive window function of the current frame is determined based on the inter-channel time difference estimation deviation of the current frame.

The adaptive window function of the current frame is determined based on the initial value of the inter-channel time difference of the current frame such that the adaptive window function of the current frame can be obtained without a need of buffering a smoothed inter-channel time difference estimation deviation of an $n^{th}$ past frame, thereby saving a storage resource.

With reference to the eleventh implementation of the first aspect, in a twelfth implementation of the first aspect, the inter-channel time difference estimation deviation of the current frame is obtained through calculation using the following calculation formula.

$$\text{dist\_reg}=|\text{reg\_prv\_corr}-\text{cur\_itd\_init}|,$$

where dist_reg is the inter-channel time difference estimation deviation of the current frame, reg_prv_corr is the delay track estimation value of the current frame, and cur_itd_init is the initial value of the inter-channel time difference of the current frame.

With reference to the eleventh implementation or the twelfth implementation of the first aspect, in a thirteenth implementation of the first aspect, a second raised cosine width parameter is calculated based on the inter-channel time difference estimation deviation of the current frame, a second raised cosine height bias is calculated based on the inter-channel time difference estimation deviation of the current frame, and the adaptive window function of the current frame is determined based on the second raised cosine width parameter and the second raised cosine height bias.

Optionally, formulas for calculating the second raised cosine width parameter are as follows.

$$\text{win\_width2}=\text{TRUNC}(\text{width\_par2}*(A*L\_\text{NCSHIFT}\_DS+1)),\ \text{and}\ \text{width\_par2}=a\_\text{width2}*\text{dist\_reg}+b\_\text{width2},$$

where $$a\_\text{width2}=(xh\_\text{width2}-xl\_\text{width2})/(yh\_\text{dist3}-yl\_\text{dist3}),\ \text{and}\ b\_\text{width2}=xh\_\text{width2}-a\_\text{width2}*yh\_\text{dist3},$$

where win_width2 is the second raised cosine width parameter, TRUNC indicates rounding a value, L_NCSHIFT_DS is a maximum value of an absolute value of an inter-channel time difference, A is a preset constant, A is greater than or equal to 4, A*L_NCSHIFT_DS+1 is a positive integer greater than zero, xh_width2 is an upper limit value of the second raised cosine width parameter, xl_width2 is a lower limit value of the second raised cosine width parameter, yh_dist3 is an inter-channel time difference estimation deviation corresponding to the upper limit value of the second raised cosine width parameter, yl_dist3 is an inter-channel time difference estimation deviation corresponding to the lower limit value of the second raised cosine width parameter, dist_reg is the inter-channel time difference estimation deviation, xh_width2, xl_width2, yh_dist3, and yl_dist3 are all positive numbers.

Optionally, the second raised cosine width parameter meets.

$$\text{width\_par2}=\min(\text{width\_par2},xh\_\text{width2}),\ \text{and}$$

$$\text{width\_par2}=\max(\text{width\_par2},xl\_\text{width2}),$$

where min represents taking of a minimum value, and max represents taking of a maximum value.

When width_par2 is greater than the upper limit value of the second raised cosine width parameter, width_par2 is limited to be the upper limit value of the second raised cosine width parameter, or when width_par2 is less than the lower limit value of the second raised cosine width parameter, width_par2 is limited to the lower limit value of the second raised cosine width parameter in order to ensure that a value of width_par2 does not exceed a normal value range of the raised cosine width parameter, thereby ensuring accuracy of a calculated adaptive window function.

Optionally, a formula for calculating the second raised cosine height bias is as follows.

$$win\_bias2 = a\_bias2 * dist\_reg + b\_bias2$$, where $$a\_bias2 = (xh\_bias2 - xl\_bias2)/(yh\_dist4 - yl\_dist4)$$, and $$b\_bias2 = xh\_bias2 - a\_bias2 * yh\_dist4$$, where win_bias2 is the second raised cosine height bias, xh_bias2 is an upper limit value of the second raised cosine height bias, xl_bias2 is a lower limit value of the second raised cosine height bias, yh_dist4 is an inter-channel time difference estimation deviation corresponding to the upper limit value of the second raised cosine height bias, yl_dist4 is an inter-channel time difference estimation deviation corresponding to the lower limit value of the second raised cosine height bias, dist_reg is the inter-channel time difference estimation deviation, and yh_dist4, yl_dist4, xh_bias2, and xl_bias2 are all positive numbers.

Optionally, the second raised cosine height bias meets.

$$win\_bias2 = \min(win\_bias2, xh\_bias2)$$, and $$win\_bias2 = \max(win\_bias2, xl\_bias2)$$, where min represents taking of a minimum value, and max represents taking of a maximum value.

When win_bias2 is greater than the upper limit value of the second raised cosine height bias, win_bias2 is limited to be the upper limit value of the second raised cosine height bias, or when win_bias2 is less than the lower limit value of the second raised cosine height bias, win_bias2 is limited to the lower limit value of the second raised cosine height bias in order to ensure that a value of win_bias2 does not exceed a normal value range of the raised cosine height bias, thereby ensuring accuracy of a calculated adaptive window function.

Optionally, yh_dist4=yh_dist3, and yl_dist4=yl_dist3.

Optionally, the adaptive window function is represented using the following formulas.

when $0 \le k \le TRUNC(A*L\_NCSHIFT\_DS/2) - 2*win\_width2 - 1$, $loc\_weight\_win(k) = win\_bias2$;

when $TRUNC(A*L\_NCSHIFT\_DS/2) - 2*win\_width2 \le k \le TRUNC(A*L\_NCSHIFT\_DS/2) + 2*win\_width2 - 1$, $$loc\_weight\_win(k) = 0.5*(1 + win\_bias2) + 0.5*(1 - win\_bias2)*\cos(\pi*(k - TRUNC(A*L\_NCSHIFT\_DS/2))/(2*win\_width2))$$; and when $TRUNC(A*L\_NCSHIFT\_DS/2) + 2*win\_width2 \le k \le A*L\_NCSHIFT\_DS$, $loc\_weight\_win(k) = win\_bias2$, where loc_weight_win(k) is used to represent the adaptive window function, where k=0, 1, . . . , A*L_NCSHIFT_DS, A is the preset constant and is greater than or equal to 4, L_NCSHIFT_DS is the maximum value of the absolute value of the inter-channel time difference, win_width2 is the second raised cosine width parameter, and win_bias2 is the second raised cosine height bias.

With reference to any one of the first aspect, and the first implementation to the thirteenth implementation of the first aspect, in a fourteenth implementation of the first aspect, the weighted cross-correlation coefficient is represented using the following formula.

$$c\_weight(x) = c(x)*loc\_weight\_win(x - TRUNC(reg\_prv\_corr) + TRUNC(A*L\_NCSHIFT\_DS/2) - L\_NCSHIFT\_DS)$$, where c_weight(x) is the weighted cross-correlation coefficient, c(x) is the cross-correlation coefficient, loc_weight_win is the adaptive window function of the current frame, TRUNC indicates rounding a value, reg_prv_corr is the delay track estimation value of the current frame, x is an integer greater than or equal to zero and less than or equal to 2*L_NCSHIFT_DS, and L_NCSHIFT_DS is the maximum value of the absolute value of the inter-channel time difference.

With reference to any one of the first aspect, and the first implementation to the fourteenth implementation of the first aspect, in a fifteenth implementation of the first aspect, before the determining an adaptive window function of the current frame, the method further includes determining an adaptive parameter of the adaptive window function of the current frame based on a coding parameter of the previous frame of the current frame, where the coding parameter is used to indicate a type of a multi-channel signal of the previous frame of the current frame, or the coding parameter is used to indicate a type of a multi-channel signal of the previous frame of the current frame on which time-domain downmixing processing is performed, and the adaptive parameter is used to determine the adaptive window function of the current frame.

The adaptive window function of the current frame needs to change adaptively based on different types of multi-channel signals of the current frame in order to ensure accuracy of an inter-channel time difference of the current frame obtained through calculation. It is of great probability that the type of the multi-channel signal of the current frame is the same as the type of the multi-channel signal of the previous frame of the current frame. Therefore, the adaptive parameter of the adaptive window function of the current frame is determined based on the coding parameter of the previous frame of the current frame such that accuracy of a determined adaptive window function is improved without additional calculation complexity.

With reference to any one of the first aspect, and the first implementation to the fifteenth implementation of the first aspect, in a sixteenth implementation of the first aspect, the determining a delay track estimation value of the current frame based on buffered inter-channel time difference information of at least one past frame includes performing delay track estimation based on the buffered inter-channel time difference information of the at least one past frame using a linear regression method, to determine the delay track estimation value of the current frame.

With reference to any one of the first aspect, and the first implementation to the fifteenth implementation of the first aspect, in a seventeenth implementation of the first aspect, the determining a delay track estimation value of the current frame based on buffered inter-channel time difference information of at least one past frame includes performing delay track estimation based on the buffered inter-channel time difference information of the at least one past frame using a weighted linear regression method, to determine the delay track estimation value of the current frame.

With reference to any one of the first aspect, and the first implementation to the seventeenth implementation of the first aspect, in an eighteenth implementation of the first aspect, after the determining an inter-channel time difference of the current frame based on the weighted cross-correlation coefficient, the method further includes updating the buffered inter-channel time difference information of the at least one past frame, where the inter-channel time difference information of the at least one past frame is an inter-channel time difference smoothed value of the at least one past frame or an inter-channel time difference of the at least one past frame.

The buffered inter-channel time difference information of the at least one past frame is updated, and when the inter-channel time difference of the next frame is calculated, a delay track estimation value of the next frame can be calculated based on updated delay difference information, thereby improving accuracy of calculating the inter-channel time difference of the next frame.

With reference to the eighteenth implementation of the first aspect, in a nineteenth implementation of the first aspect, the buffered inter-channel time difference information of the at least one past frame is the inter-channel time difference smoothed value of the at least one past frame, and the updating the buffered inter-channel time difference information of the at least one past frame includes determining an inter-channel time difference smoothed value of the current frame based on the delay track estimation value of the current frame and the inter-channel time difference of the current frame, and updating a buffered inter-channel time difference smoothed value of the at least one past frame based on the inter-channel time difference smoothed value of the current frame.

With reference to the nineteenth implementation of the first aspect, in a twentieth implementation of the first aspect, the inter-channel time difference smoothed value of the current frame is obtained using the following calculation formula.

$$cur\_itd\_smooth=\varphi*reg\_prv\_corr+(1-\varphi)*cur\_itd,$$

where cur_itd_smooth is the inter-channel time difference smoothed value of the current frame, φ is a second smoothing factor, reg_prv_corr is the delay track estimation value of the current frame, cur_itd is the inter-channel time difference of the current frame, and φ is a constant greater than or equal to 0 and less than or equal to 1.

With reference to any one of the eighteenth implementation to the twentieth implementation of the first aspect, in a twenty-first implementation of the first aspect, the updating the buffered inter-channel time difference information of the at least one past frame includes, when a voice activation detection result of the previous frame of the current frame is an active frame or a voice activation detection result of the current frame is an active frame, updating the buffered inter-channel time difference information of the at least one past frame.

When the voice activation detection result of the previous frame of the current frame is the active frame or the voice activation detection result of the current frame is the active frame, it indicates that it is of great possibility that the multi-channel signal of the current frame is the active frame. When the multi-channel signal of the current frame is the active frame, validity of inter-channel time difference information of the current frame is relatively high. Therefore, it is determined, based on the voice activation detection result of the previous frame of the current frame or the voice activation detection result of the current frame, whether to update the buffered inter-channel time difference information of the at least one past frame, thereby improving validity of the buffered inter-channel time difference information of the at least one past frame.

With reference to at least one of the seventeenth implementation to the twenty-first implementation of the first aspect, in a twenty-second implementation of the first aspect, after the determining an inter-channel time difference of the current frame based on the weighted cross-correlation coefficient, the method further includes updating a buffered weighting coefficient of the at least one past frame, where the weighting coefficient of the at least one past frame is a coefficient in the weighted linear regression method, and the weighted linear regression method is used to determine the delay track estimation value of the current frame.

When the delay track estimation value of the current frame is determined using the weighted linear regression method, the buffered weighting coefficient of the at least one past frame is updated such that the delay track estimation value of the next frame can be calculated based on an updated weighting coefficient, thereby improving accuracy of calculating the delay track estimation value of the next frame.

With reference to the twenty-second implementation of the first aspect, in a twenty-third implementation of the first aspect, when the adaptive window function of the current frame is determined based on a smoothed inter-channel time difference of the previous frame of the current frame, the updating a buffered weighting coefficient of the at least one past frame includes calculating a first weighting coefficient of the current frame based on the smoothed inter-channel time difference estimation deviation of the current frame, and updating a buffered first weighting coefficient of the at least one past frame based on the first weighting coefficient of the current frame.

With reference to the twenty-third implementation of the first aspect, in a twenty-fourth implementation of the first aspect, the first weighting coefficient of the current frame is obtained through calculation using the following calculation formulas.

$$wgt\_par1=a\_wgt1*smooth\_dist\_reg\_update+b\_wgt1,$$

$$a\_wgt1=(xl\_wgt1-xh\_wgt1)/(yh\_dist1'-yl\_dist1'),\text{ and}$$

$$b\_wgt1=xl\_wgt1-a\_wgt1*yh\_dist1',$$

where wgt_par1 is the first weighting coefficient of the current frame, smooth_dist_reg_update is the smoothed inter-channel time difference estimation deviation of the current frame, xh_wgt is an upper limit value of the first weighting coefficient, xl_wgt is a lower limit value of the first weighting coefficient, yh_dist1' is a smoothed inter-channel time difference estimation deviation corresponding to the upper limit value of the first weighting coefficient, yl_dist1' is a smoothed inter-channel time difference estimation deviation corresponding to the lower limit value of the first weighting coefficient, and yh_dist1', yl_dist1', xh_wgt1, and xl_wgt1 are all positive numbers.

With reference to the twenty-fourth implementation of the first aspect, in a twenty-fifth implementation of the first aspect, $$wgt\_par1=\min(wgt\_par1,xh\_wgt1),\text{ and}$$

$$wgt\_par1=\max(wgt\_par1,xl\_wgt1),$$

where min represents taking of a minimum value, and max represents taking of a maximum value.

When wgt_par1 is greater than the upper limit value of the first weighting coefficient, wgt_par1 is limited to be the upper limit value of the first weighting coefficient, or when wgt_par1 is less than the lower limit value of the first weighting coefficient, wgt_par1 is limited to the lower limit value of the first weighting coefficient in order to ensure that a value of wgt_par1 does not exceed a normal value range of the first weighting coefficient, thereby ensuring accuracy of the calculated delay track estimation value of the current frame.

With reference to the twenty-second implementation of the first aspect, in a twenty-sixth implementation of the first aspect, when the adaptive window function of the current frame is determined based on the inter-channel time difference estimation deviation of the current frame, the updating a buffered weighting coefficient of the at least one past frame includes calculating a second weighting coefficient of the current frame based on the inter-channel time difference estimation deviation of the current frame, and updating a buffered second weighting coefficient of the at least one past frame based on the second weighting coefficient of the current frame.

Optionally, the second weighting coefficient of the current frame is obtained through calculation using the following calculation formulas.

$$wgt\_par2=a\_wgt2*dist\_reg+b\_wgt2,$$

$$a\_wgt2=(xl\_wgt2-xh\_wgt2)/(yh\_dist2'-yl\_dist2'), \text{ and}$$

$$b\_wgt2=xl\_wgt2-a\_wgt2*yh\_dist2',$$

where wgt_par2 is the second weighting coefficient of the current frame, dist_reg is the inter-channel time difference estimation deviation of the current frame, xh_wgt2 is an upper limit value of the second weighting coefficient, xl_wgt2 is a lower limit value of the second weighting coefficient, yh_dist2' is an inter-channel time difference estimation deviation corresponding to the upper limit value of the second weighting coefficient, yl_dist2' is an inter-channel time difference estimation deviation corresponding to the lower limit value of the second weighting coefficient, and yh_dist2', yl_dist2', xh_wgt2, and xl_wgt2 are all positive numbers.

Optionally, wgt_par2=min(wgt_par2, xh_wgt2), and wgt_par2=max(wgt_par2, xl_wgt2).

With reference to any one of the twenty-third implementation to the twenty-sixth implementation of the first aspect, in a twenty-seventh implementation of the first aspect, the updating a buffered weighting coefficient of the at least one past frame includes, when a voice activation detection result of the previous frame of the current frame is an active frame or a voice activation detection result of the current frame is an active frame, updating the buffered weighting coefficient of the at least one past frame.

When the voice activation detection result of the previous frame of the current frame is the active frame or the voice activation detection result of the current frame is the active frame, it indicates that it is of great possibility that the multi-channel signal of the current frame is the active frame. When the multi-channel signal of the current frame is the active frame, validity of a weighting coefficient of the current frame is relatively high. Therefore, it is determined, based on the voice activation detection result of the previous frame of the current frame or the voice activation detection result of the current frame, whether to update the buffered weighting coefficient of the at least one past frame, thereby improving validity of the buffered weighting coefficient of the at least one past frame.

According to a second aspect, a delay estimation apparatus is provided. The apparatus includes at least one unit, and the at least one unit is configured to implement the delay estimation method provided in any one of the first aspect or the implementations of the first aspect.

According to a third aspect, an audio coding device is provided. The audio coding device includes a processor and a memory connected to the processor.

The memory is configured to be controlled by the processor, and the processor is configured to implement the delay estimation method provided in any one of the first aspect or the implementations of the first aspect.

According to a fourth aspect, a computer readable storage medium is provided. The computer readable storage medium stores an instruction, and when the instruction is run on an audio coding device, the audio coding device is enabled to perform the delay estimation method provided in any one of the first aspect or the implementations of the first aspect.

DESCRIPTION OF EMBODIMENTS

The words “first”, “second” and similar words mentioned in this specification do not mean any order, quantity or importance, but are used to distinguish between different components. Likewise, “one”, “a/an”, or the like is not intended to indicate a quantity limitation either, but is intended to indicate existing at least one. “Connection”, “link” or the like is not limited to a physical or mechanical connection, but may include an electrical connection, regardless of a direct connection or an indirect connection.

In this specification, “a plurality of” refers to two or more than two. The term “and/or” describes an association relationship for describing associated objects and represents that three relationships may exist. For example, A and/or B may represent the following three cases. Only A exists, both A and B exist, and only B exists. The character “/” generally indicates an “or” relationship between the associated objects.

Figure 1:
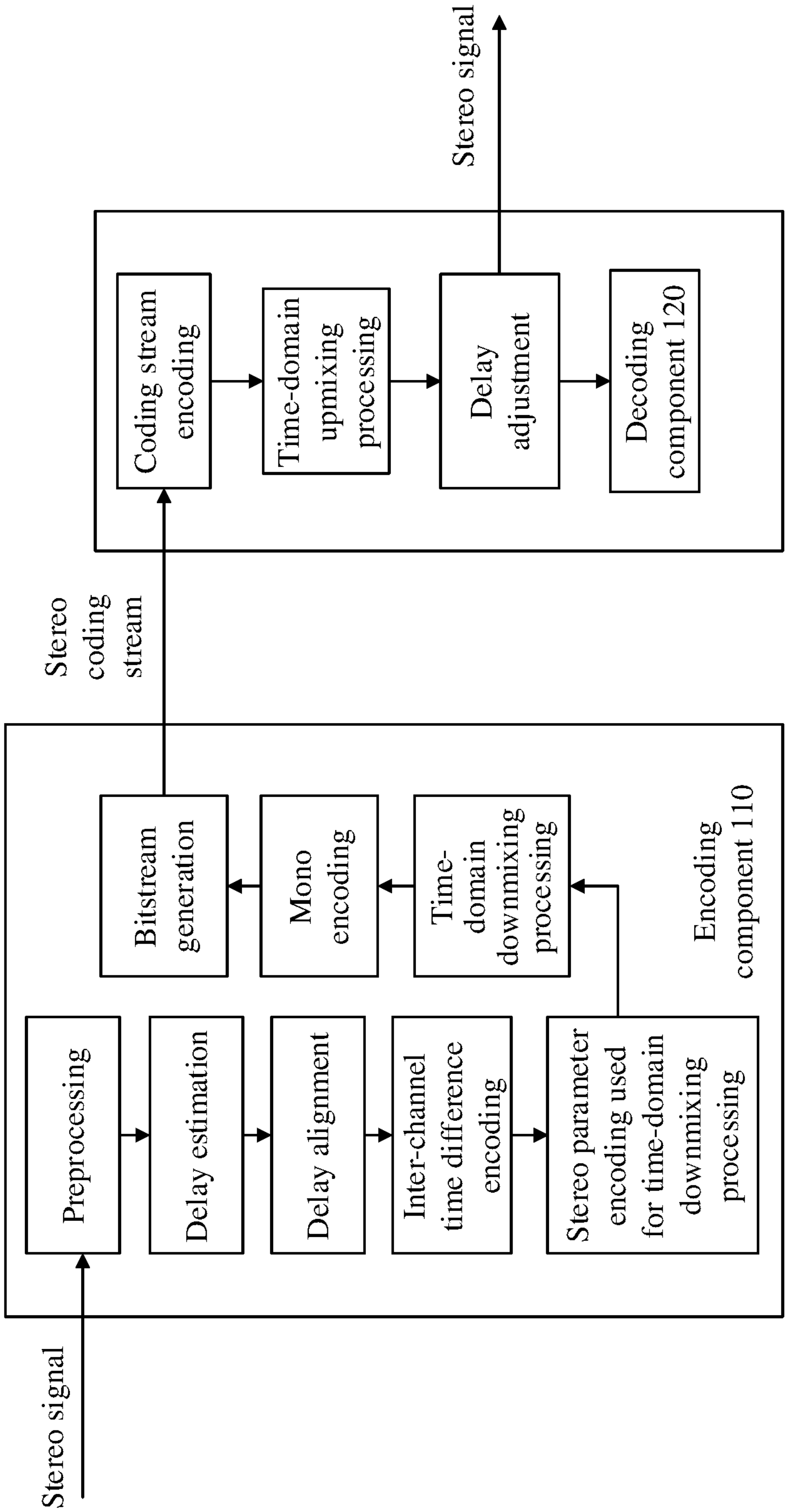
FIG. 1 is a schematic structural diagram of a stereo signal encoding and decoding system according to an example embodiment of this application.

FIG. 1 is a schematic structural diagram of a stereo encoding and decoding system in time domain according to an example embodiment of this application. The stereo encoding and decoding system includes an encoding component 110 and a decoding component 120.

The encoding component 110 is configured to encode a stereo signal in time domain. Optionally, the encoding component 110 may be implemented using software, may be implemented using hardware, or may be implemented in a form of a combination of software and hardware. This is not limited in this embodiment.

The encoding a stereo signal in time domain by the encoding component 110 includes the following steps.

(1) Perform time-domain preprocessing on an obtained stereo signal to obtain a preprocessed left channel signal and a preprocessed right channel signal.

The stereo signal is collected by a collection component and sent to the encoding component 110. Optionally, the collection component and the encoding component 110 may be disposed in a same device or in different devices.

The preprocessed left channel signal and the preprocessed right channel signal are two signals of the preprocessed stereo signal.

Optionally, the preprocessing includes at least one of high-pass filtering processing, pre-emphasis processing, sampling rate conversion, and channel conversion. This is not limited in this embodiment.

(2) Perform delay estimation based on the preprocessed left channel signal and the preprocessed right channel signal to obtain an inter-channel time difference between the preprocessed left channel signal and the preprocessed right channel signal.

(3) Perform delay alignment processing on the preprocessed left channel signal and the preprocessed right channel signal based on the inter-channel time difference, to obtain a left channel signal obtained after delay alignment processing and a right channel signal obtained after delay alignment processing.

(4) Encode the inter-channel time difference to obtain an encoding index of the inter-channel time difference.

(5) Calculate a stereo parameter used for time-domain downmixing processing, and encode the stereo parameter used for time-domain downmixing processing to obtain an encoding index of the stereo parameter used for time-domain downmixing processing.

The stereo parameter used for time-domain downmixing processing is used to perform time-domain downmixing processing on the left channel signal obtained after delay alignment processing and the right channel signal obtained after delay alignment processing.

(6) Perform, based on the stereo parameter used for time-domain downmixing processing, time-domain downmixing processing on the left channel signal and the right channel signal that are obtained after delay alignment processing, to obtain a primary channel signal and a secondary channel signal.

Time-domain downmixing processing is used to obtain the primary channel signal and the secondary channel signal.

After the left channel signal and the right channel signal that are obtained after delay alignment processing are processed using a time-domain downmixing technology, the primary channel signal (Primary channel, or referred to as a middle channel (Mid channel) signal), and the secondary channel (Secondary channel, or referred to as a side channel (Side channel) signal) are obtained.

The primary channel signal is used to represent information about correlation between channels, and the secondary channel signal is used to represent information about a difference between channels. When the left channel signal and the right channel signal that are obtained after delay alignment processing are aligned in time domain, the secondary channel signal is the weakest, and in this case, the stereo signal has a best effect.

Figure 4:
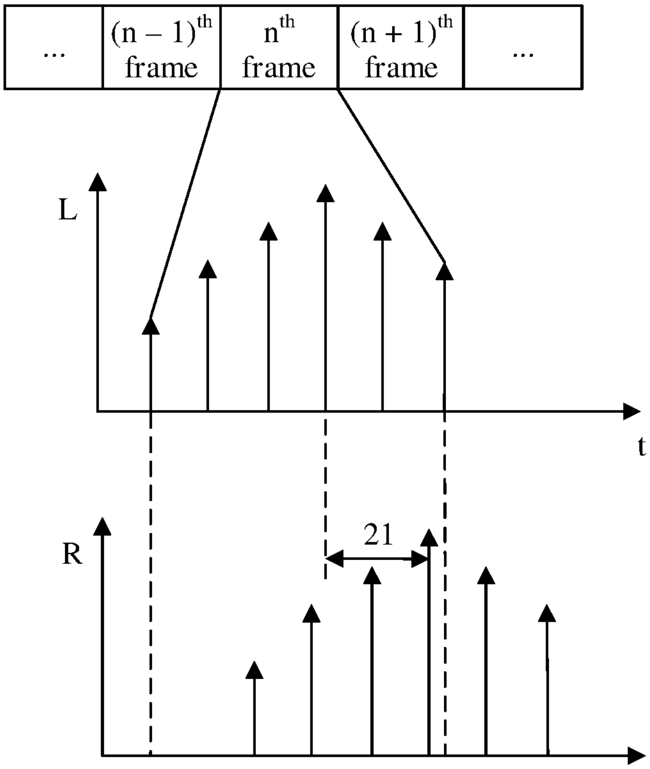
FIG. 4 is a schematic diagram of an inter-channel time difference according to an example embodiment of this application.

Reference is made to a preprocessed left channel signal L and a preprocessed right channel signal R in an $n^{th}$ frame shown in FIG. 4. The preprocessed left channel signal L is located before the preprocessed right channel signal R. In other words, compared with the preprocessed right channel signal R, the preprocessed left channel signal L has a delay, and there is an inter-channel time difference 21 between the preprocessed left channel signal L and the preprocessed right channel signal R. In this case, the secondary channel signal is enhanced, the primary channel signal is weakened, and the stereo signal has a relatively poor effect.

(7) Separately encode the primary channel signal and the secondary channel signal to obtain a first mono encoded bitstream corresponding to the primary channel signal and a second mono encoded bitstream corresponding to the secondary channel signal.

(8) Write the encoding index of the inter-channel time difference, the encoding index of the stereo parameter, the first mono encoded bitstream, and the second mono encoded bitstream into a stereo encoded bitstream.

The decoding component 120 is configured to decode the stereo encoded bitstream generated by the encoding component 110 to obtain the stereo signal.

Optionally, the encoding component 110 is connected to the decoding component 120 wiredly or wirelessly, and the decoding component 120 obtains, through the connection, the stereo encoded bitstream generated by the encoding component 110. Alternatively, the encoding component 110 stores the generated stereo encoded bitstream into a memory, and the decoding component 120 reads the stereo encoded bitstream in the memory.

Optionally, the decoding component 120 may be implemented using software, may be implemented using hardware, or may be implemented in a form of a combination of software and hardware. This is not limited in this embodiment.

The decoding the stereo encoded bitstream to obtain the stereo signal by the decoding component 120 includes the following several steps.

(1) Decode the first mono encoded bitstream and the second mono encoded bitstream in the stereo encoded bitstream to obtain the primary channel signal and the secondary channel signal.

(2) Obtain, based on the stereo encoded bitstream, an encoding index of a stereo parameter used for time-domain upmixing processing, and perform time-domain upmixing processing on the primary channel signal and the secondary channel signal to obtain a left channel signal obtained after time-domain upmixing processing and a right channel signal obtained after time-domain upmixing processing.

(3) Obtain the encoding index of the inter-channel time difference based on the stereo encoded bitstream, and perform delay adjustment on the left channel signal obtained after time-domain upmixing processing and the right channel signal obtained after time-domain upmixing processing to obtain the stereo signal.

Optionally, the encoding component 110 and the decoding component 120 may be disposed in a same device, or may be disposed in different devices. The device may be a mobile terminal that has an audio signal processing function, such as a mobile phone, a tablet computer, a laptop portable computer, a desktop computer, a BLUETOOTH speaker, a pen recorder, or a wearable device, or may be a network element that has an audio signal processing capability in a core network or a radio network. This is not limited in this embodiment.

Figure 2:
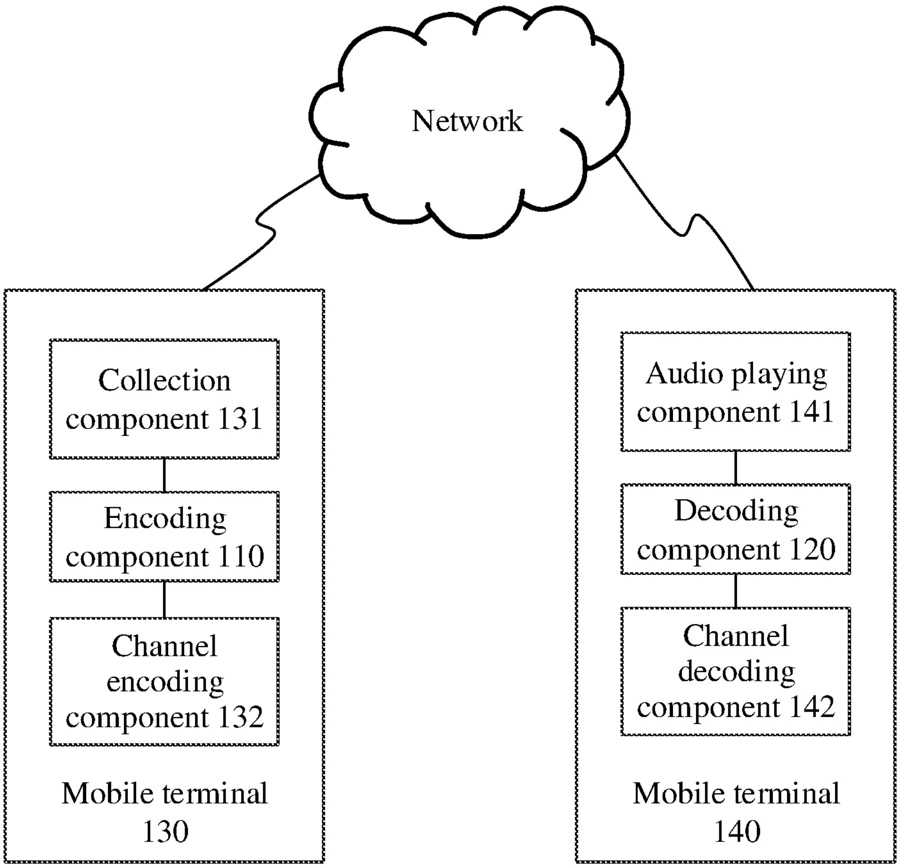
FIG. 2 is a schematic structural diagram of a stereo signal encoding and decoding system according to another example embodiment of this application.

For example, referring to FIG. 2, an example in which the encoding component 110 is disposed in a mobile terminal 130, and the decoding component 120 is disposed in a mobile terminal 140. The mobile terminal 130 and the mobile terminal 140 are independent electronic devices with an audio signal processing capability, and the mobile terminal 130 and the mobile terminal 140 are connected to each other using a wireless or wired network is used in this embodiment for description.

Optionally, the mobile terminal 130 includes a collection component 131, the encoding component 110, and a channel encoding component 132. The collection component 131 is connected to the encoding component 110, and the encoding component 110 is connected to the channel encoding component 132.

Optionally, the mobile terminal 140 includes an audio playing component 141, the decoding component 120, and a channel decoding component 142. The audio playing component 141 is connected to the decoding component 110, and the decoding component 110 is connected to the channel encoding component 132.

After collecting the stereo signal using the collection component 131, the mobile terminal 130 encodes the stereo signal using the encoding component 110 to obtain the stereo encoded bitstream. Then, the mobile terminal 130 encodes the stereo encoded bitstream using the channel encoding component 132 to obtain a transmit signal.

The mobile terminal 130 sends the transmit signal to the mobile terminal 140 using the wireless or wired network.

After receiving the transmit signal, the mobile terminal 140 decodes the transmit signal using the channel decoding component 142 to obtain the stereo encoded bitstream, decodes the stereo encoded bitstream using the decoding component 110 to obtain the stereo signal, and plays the stereo signal using the audio playing component 141.

Figure 3:
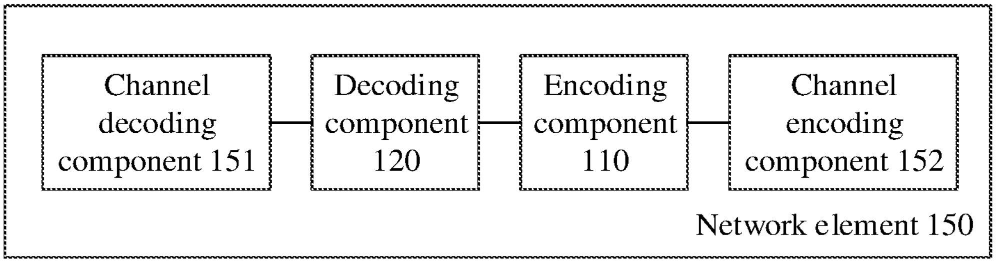
FIG. 3 is a schematic structural diagram of a stereo signal encoding and decoding system according to another example embodiment of this application.

For example, referring to FIG. 3, this embodiment is described using an example in which the encoding component 110 and the decoding component 120 are disposed in a same network element 150 that has an audio signal processing capability in a core network or a radio network.

Optionally, the network element 150 includes a channel decoding component 151, the decoding component 120, the encoding component 110, and a channel encoding component 152. The channel decoding component 151 is connected to the decoding component 120, the decoding component 120 is connected to the encoding component 110, and the encoding component 110 is connected to the channel encoding component 152.

After receiving a transmit signal sent by another device, the channel decoding component 151 decodes the transmit signal to obtain a first stereo encoded bitstream, decodes the stereo encoded bitstream using the decoding component 120 to obtain a stereo signal, encodes the stereo signal using the encoding component 110 to obtain a second stereo encoded bitstream, and encodes the second stereo encoded bitstream using the channel encoding component 152 to obtain a transmit signal.

The other device may be a mobile terminal that has an audio signal processing capability, or may be another network element that has an audio signal processing capability. This is not limited in this embodiment.

Optionally, the encoding component 110 and the decoding component 120 in the network element may transcode a stereo encoded bitstream sent by the mobile terminal.

Optionally, in this embodiment, a device on which the encoding component 110 is installed is referred to as an audio coding device. In an embodiment, the audio coding device may also have an audio decoding function. This is not limited in this embodiment.

Optionally, in this embodiment, only the stereo signal is used as an example for description. In this application, the audio coding device may further process a multi-channel signal, where the multi-channel signal includes at least two channel signals.

Several nouns in the embodiments of this application are described below.

A multi-channel signal of a current frame is a frame of multi-channel signals used to estimate a current inter-channel time difference. The multi-channel signal of the current frame includes at least two channel signals. Channel signals of different channels may be collected using different audio collection components in the audio coding device, or channel signals of different channels may be collected by different audio collection components in another device. The channel signals of different channels are transmitted from a same sound source.

For example, the multi-channel signal of the current frame includes a left channel signal L and a right channel signal R. The left channel signal L is collected using a left channel audio collection component, the right channel signal R is collected using a right channel audio collection component, and the left channel signal L and the right channel signal R are from a same sound source.

Referring to FIG. 4, an audio coding device is estimating an inter-channel time difference of a multi-channel signal of an $n^{th}$ frame, and the $n^{th}$ frame is the current frame.

A previous frame of the current frame is a first frame that is located before the current frame, for example, if the current frame is the $n^{th}$ frame, the previous frame of the current frame is an $(n-1)^{th}$ frame.

Optionally, the previous frame of the current frame may also be briefly referred to as the previous frame.

A past frame is located before the current frame in time domain, and the past frame includes the previous frame of the current frame, first two frames of the current frame, first three frames of the current frame, and the like. Referring to FIG. 4, if the current frame is the $n^{th}$ frame, the past frame includes the $(n-1)^{th}$ frame, the $(n-2)^{th}$ frame, . . . , and the first frame.

Optionally, in this application, at least one past frame may be M frames located before the current frame, for example, eight frames located before the current frame.

A next frame is a first frame after the current frame. Referring to FIG. 4, if the current frame is the $n^{th}$ frame, the next frame is an $(n+1)^{th}$ frame.

A frame length is duration of a frame of multi-channel signals. Optionally, the frame length is represented by a quantity of sampling points, for example, a frame length N=320 sampling points.

A cross-correlation coefficient is used to represent a degree of cross correlation between channel signals of different channels in the multi-channel signal of the current frame under different inter-channel time differences. The degree of cross correlation is represented using a cross-correlation value. For any two channel signals in the multi-channel signal of the current frame, under an inter-channel time difference, if two channel signals obtained after delay adjustment is performed based on the inter-channel time difference are more similar, the degree of cross correlation is stronger, and the cross-correlation value is greater, or if a difference between two channel signals obtained after delay adjustment is performed based on the inter-channel time difference is greater, the degree of cross correlation is weaker, and the cross-correlation value is smaller.

An index value of the cross-correlation coefficient corresponds to an inter-channel time difference, and a cross-correlation value corresponding to each index value of the cross-correlation coefficient represents a degree of cross correlation between two mono signals that are obtained after delay adjustment and that correspond to each inter-channel time difference.

Optionally, the cross-correlation coefficient may also be referred to as a group of cross-correlation values or referred to as a cross-correlation function. This is not limited in this application.

Referring to FIG. 4, when a cross-correlation coefficient of a channel signal of an $a^{th}$ frame is calculated, cross-correlation values between the left channel signal L and the right channel signal R are separately calculated under different inter-channel time differences.

For example, when the index value of the cross-correlation coefficient is 0, the inter-channel time difference is −N/2 sampling points, and the inter-channel time difference is used to align the left channel signal L and the right channel signal R to obtain the cross-correlation value k0, when the index value of the cross-correlation coefficient is 1, the inter-channel time difference is (−N/2+1) sampling points, and the inter-channel time difference is used to align the left channel signal L and the right channel signal R to obtain the cross-correlation value k1, when the index value of the cross-correlation coefficient is 2, the inter-channel time difference is (−N/2+2) sampling points, and the inter-channel time difference is used to align the left channel signal L and the right channel signal R to obtain the cross-correlation value k2, when the index value of the cross-correlation coefficient is 3, the inter-channel time difference is (−N/2+3) sampling points, and the inter-channel time difference is used to align the left channel signal L and the right channel signal R to obtain the cross-correlation value k3, . . . , and when the index value of the cross-correlation coefficient is N, the inter-channel time difference is N/2 sampling points, and the inter-channel time difference is used to align the left channel signal L and the right channel signal R to obtain the cross-correlation value kN.

A maximum value in k0 to kN is searched, for example, k3 is maximum. In this case, it indicates that when the inter-channel time difference is (−N/2+3) sampling points, the left channel signal L and the right channel signal R are most similar, in other words, the inter-channel time difference is closest to a real inter-channel time difference.

It should be noted that this embodiment is only used to describe a principle that the audio coding device determines the inter-channel time difference using the cross-correlation coefficient. In an embodiment, the inter-channel time difference may not be determined using the foregoing method.

Figure 5:
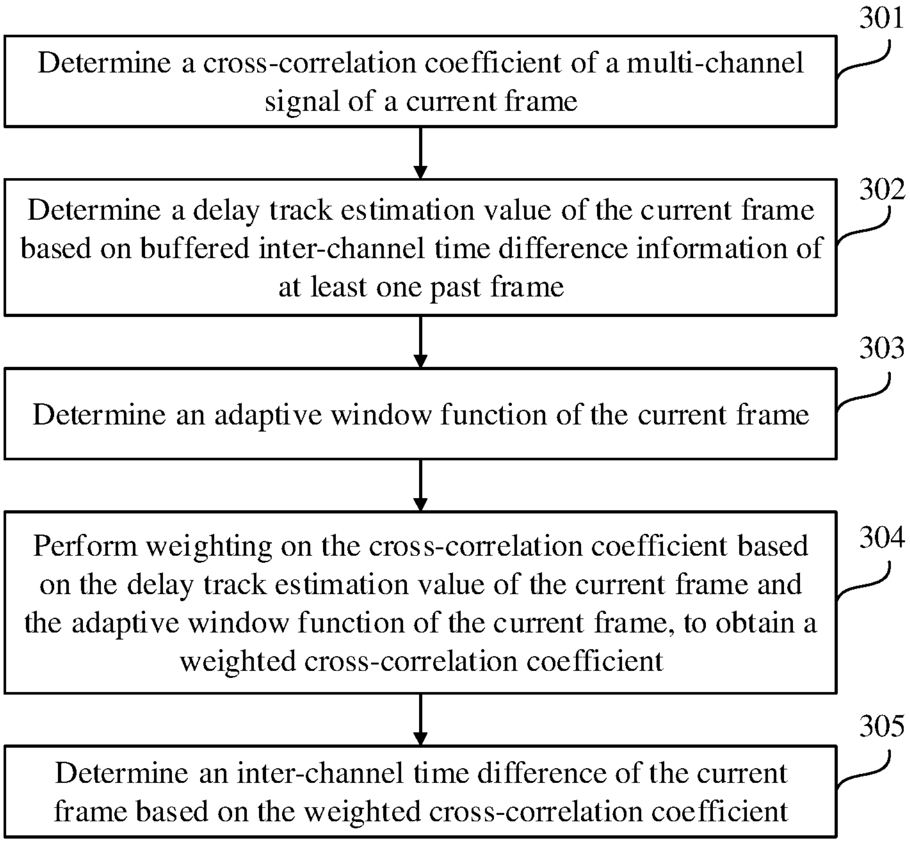
FIG. 5 is a flowchart of a delay estimation method according to an example embodiment of this application.

FIG. 5 is a flowchart of a delay estimation method according to an example embodiment of this application. The method includes the following several steps.

Step 301. Determine a cross-correlation coefficient of a multi-channel signal of a current frame.

Step 302. Determine a delay track estimation value of the current frame based on buffered inter-channel time difference information of at least one past frame.

Optionally, the at least one past frame is consecutive in time, and a last frame in the at least one past frame and the current frame are consecutive in time. In other words, the last past frame in the at least one past frame is a previous frame of the current frame. Alternatively, the at least one past frame is spaced by a predetermined quantity of frames in time, and a last past frame in the at least one past frame is spaced by a predetermined quantity of frames from the current frame. Alternatively, the at least one past frame is inconsecutive in time, a quantity of frames spaced between the at least one past frame is not fixed, and a quantity of frames between a last past frame in the at least one past frame and the current frame is not fixed. A value of the predetermined quantity of frames is not limited in this embodiment, for example, two frames.

In this embodiment, a quantity of past frames is not limited. For example, the quantity of past frames is 8, 12, and 25.

The delay track estimation value is used to represent a predicted value of an inter-channel time difference of the current frame. In this embodiment, a delay track is simulated based on the inter-channel time difference information of the at least one past frame, and the delay track estimation value of the current frame is calculated based on the delay track.

Optionally, the inter-channel time difference information of the at least one past frame is an inter-channel time difference of the at least one past frame, or an inter-channel time difference smoothed value of the at least one past frame.

An inter-channel time difference smoothed value of each past frame is determined based on a delay track estimation value of the frame and an inter-channel time difference of the frame.

Step 303. Determine an adaptive window function of the current frame.

Optionally, the adaptive window function is a raised cosine-like window function. The adaptive window function has a function of relatively enlarging a middle part and suppressing an edge part.

Optionally, adaptive window functions corresponding to frames of channel signals are different.

The adaptive window function is represented using the following formulas.

When $0 \le k \le \mathrm{TRUNC}(A*L\_\mathrm{NCSHIFT}\_DS/2) - 2*\mathrm{win\_width} - 1$, $\mathrm{loc\_weight\_win}(k) = \mathrm{win\_bias}$;

when $\mathrm{TRUNC}(A*L\_\mathrm{NCSHIFT}\_DS/2) - 2*\mathrm{win\_width} \le k \le \mathrm{TRUNC}(A*L\_\mathrm{NCSHIFT}\_DS/2) + 2*\mathrm{win\_width} - 1$, $$\mathrm{loc\_weight\_win}(k) = 0.5*(1+\mathrm{win\_bias}) + 0.5*(1-\mathrm{win\_bias})*\cos(\pi*(k-\mathrm{TRUNC}(A*L\_\mathrm{NCSHIFT}\_DS/2))/(2*\mathrm{win\_width}))$$; and when $\mathrm{TRUNC}(A*L\_\mathrm{NCSHIFT}\_DS/2) + 2*\mathrm{win\_width} \le k \le A*L\_\mathrm{NCSHIFT}\_DS$, $\mathrm{loc\_weight\_win}(k) = \mathrm{win\_bias}$, where loc_weight_win(k) is used to represent the adaptive window function, where k=0, 1, . . . , A*L_NCSHIFT_DS, A is a preset constant greater than or equal to 4, for example, A=4, TRUNC indicates rounding a value, for example, rounding a value of A*L_NCSHIFT_DS/2 in the formula of the adaptive window function, L_NCSHIFT_DS is a maximum value of an absolute value of an inter-channel time difference, win_width is used to represent a raised cosine width parameter of the adaptive window function, and win_bias is used to represent a raised cosine height bias of the adaptive window function.

Optionally, the maximum value of the absolute value of the inter-channel time difference is a preset positive number, and is usually a positive integer greater than zero and less than or equal to a frame length, for example, 40, 60, or 80.

Optionally, a maximum value of the inter-channel time difference or a minimum value of the inter-channel time difference is a preset positive integer, and the maximum value of the absolute value of the inter-channel time difference is obtained by taking an absolute value of the maximum value of the inter-channel time difference, or the maximum value of the absolute value of the inter-channel time difference is obtained by taking an absolute value of the minimum value of the inter-channel time difference.

For example, the maximum value of the inter-channel time difference is 40, the minimum value of the inter-channel time difference is −40, and the maximum value of the absolute value of the inter-channel time difference is 40, which is obtained by taking an absolute value of the maximum value of the inter-channel time difference and is also obtained by taking an absolute value of the minimum value of the inter-channel time difference.

For another example, the maximum value of the inter-channel time difference is 40, the minimum value of the inter-channel time difference is −20, and the maximum value of the absolute value of the inter-channel time difference is 40, which is obtained by taking an absolute value of the maximum value of the inter-channel time difference.

For another example, the maximum value of the inter-channel time difference is 40, the minimum value of the inter-channel time difference is −60, and the maximum value of the absolute value of the inter-channel time difference is 60, which is obtained by taking an absolute value of the minimum value of the inter-channel time difference.

It can be learned from the formula of the adaptive window function that the adaptive window function is a raised cosine-like window with a fixed height on both sides and a convexity in the middle. The adaptive window function includes a constant-weight window and a raised cosine window with a height bias. A weight of the constant-weight window is determined based on the height bias. The adaptive window function is mainly determined by two parameters the raised cosine width parameter and the raised cosine height bias.

Figure 6:
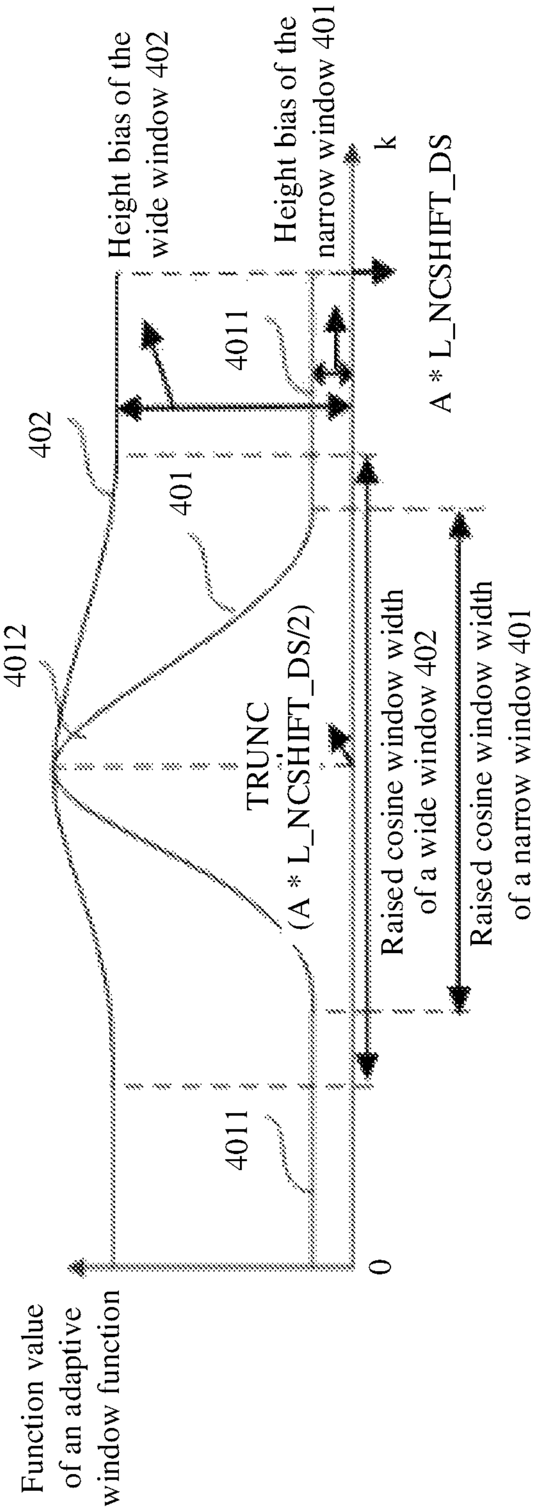
FIG. 6 is a schematic diagram of an adaptive window function according to an example embodiment of this application.

Reference is made to a schematic diagram of an adaptive window function shown in FIG. 6. Compared with a wide window 402, a narrow window 401 means that a window width of a raised cosine window in the adaptive window function is relatively small, and a difference between a delay track estimation value corresponding to the narrow window 401 and an actual inter-channel time difference is relatively small. Compared with the narrow window 401, the wide window 402 means that the window width of the raised cosine window in the adaptive window function is relatively large, and a difference between a delay track estimation value corresponding to the wide window 402 and the actual inter-channel time difference is relatively large. In other words, the window width of the raised cosine window in the adaptive window function is positively correlated with the difference between the delay track estimation value and the actual inter-channel time difference.

The raised cosine width parameter and the raised cosine height bias of the adaptive window function are related to inter-channel time difference estimation deviation information of a multi-channel signal of each frame. The inter-channel time difference estimation deviation information is used to represent a deviation between a predicted value of an inter-channel time difference and an actual value.

Figure 7:
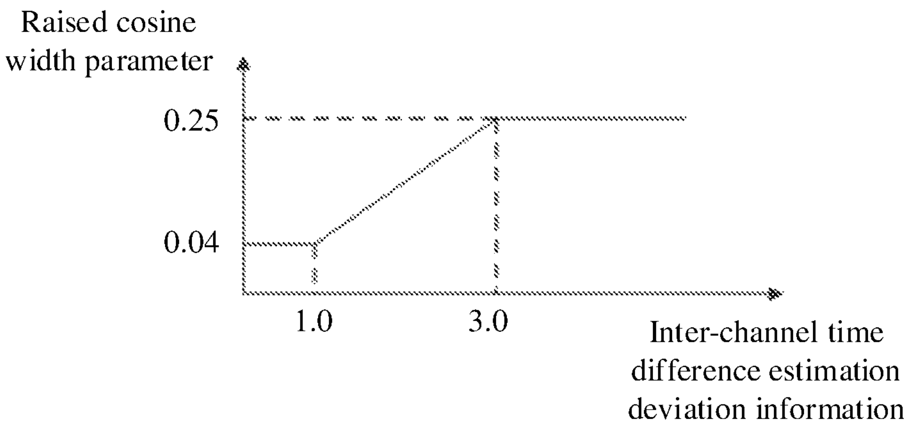
FIG. 7 is a schematic diagram of a relationship between a raised cosine width parameter and inter-channel time difference estimation deviation information according to an example embodiment of this application.

Reference is made to a schematic diagram of a relationship between a raised cosine width parameter and inter-channel time difference estimation deviation information shown in FIG. 7. If an upper limit value of the raised cosine width parameter is 0.25, a value of the inter-channel time difference estimation deviation information corresponding to the upper limit value of the raised cosine width parameter is 3.0. In this case, the value of the inter-channel time difference estimation deviation information is relatively large, and a window width of a raised cosine window in an adaptive window function is relatively large (refer to the wide window 402 in FIG. 6). If a lower limit value of the raised cosine width parameter of the adaptive window function is 0.04, a value of the inter-channel time difference estimation deviation information corresponding to the lower limit value of the raised cosine width parameter is 1.0. In this case, the value of the inter-channel time difference estimation deviation information is relatively small, and the window width of the raised cosine window in the adaptive window function is relatively small (refer to the narrow window 401 in FIG. 6).

Figure 8:
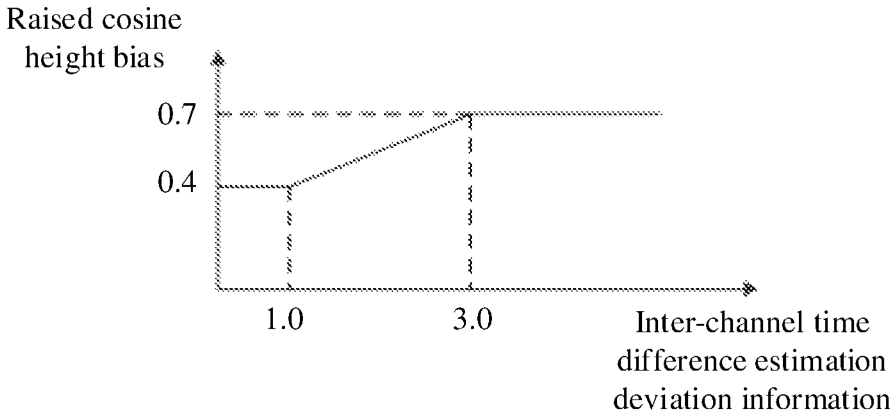
FIG. 8 is a schematic diagram of a relationship between a raised cosine height bias and inter-channel time difference estimation deviation information according to an example embodiment of this application.

Reference is made to a schematic diagram of a relationship between a raised cosine height bias and inter-channel time difference estimation deviation information shown in FIG. 8. If an upper limit value of the raised cosine height bias is 0.7, a value of the inter-channel time difference estimation deviation information corresponding to the upper limit value of the raised cosine height bias is 3.0. In this case, the smoothed inter-channel time difference estimation deviation is relatively large, and a height bias of a raised cosine window in an adaptive window function is relatively large (refer to the wide window 402 in FIG. 6). If a lower limit value of the raised cosine height bias is 0.4, a value of the inter-channel time difference estimation deviation information corresponding to the lower limit value of the raised cosine height bias is 1.0. In this case, the value of the inter-channel time difference estimation deviation information is relatively small, and the height bias of the raised cosine window in the adaptive window function is relatively small (refer to the narrow window 401 in FIG. 6).

Step 304. Perform weighting on the cross-correlation coefficient based on the delay track estimation value of the current frame and the adaptive window function of the current frame, to obtain a weighted cross-correlation coefficient.

The weighted cross-correlation coefficient may be obtained through calculation using the following calculation formula.

$$c\_weight(x)=c(x)*\mathrm{loc\_weight\_win}(x-\mathrm{TRUNC}(\mathrm{reg\_prv\_corr})+\mathrm{TRUNC}(A*L\_\mathrm{NCSHIFT}\_DS/2)-L\_\mathrm{NCSHIFT}\_DS),$$

where c_weight(x) is the weighted cross-correlation coefficient, c(x) is the cross-correlation coefficient, loc_weight_win is the adaptive window function of the current frame, TRUNC indicates rounding a value, for example, rounding reg_prv_corr in the formula of the weighted cross-correlation coefficient, and rounding a value of A*L_NCSHIFT_DS/2, reg_prv_corr is the delay track estimation value of the current frame, and x is an integer greater than or equal to zero and less than or equal to 2*L_NCSHIFT_DS.

The adaptive window function is the raised cosine-like window, and has the function of relatively enlarging a middle part and suppressing an edge part. Therefore, when weighting is performed on the cross-correlation coefficient based on the delay track estimation value of the current frame and the adaptive window function of the current frame, if an index value is closer to the delay track estimation value, a weighting coefficient of a corresponding cross-correlation value is greater, and if the index value is farther from the delay track estimation value, the weighting coefficient of the corresponding cross-correlation value is smaller. The raised cosine width parameter and the raised cosine height bias of the adaptive window function adaptively suppress the cross-correlation value corresponding to the index value, away from the delay track estimation value, in the cross-correlation coefficient.

Step 305. Determine an inter-channel time difference of the current frame based on the weighted cross-correlation coefficient.

The determining an inter-channel time difference of the current frame based on the weighted cross-correlation coefficient includes searching for a maximum value of the cross-correlation value in the weighted cross-correlation coefficient, and determining the inter-channel time difference of the current frame based on an index value corresponding to the maximum value.

Optionally, the searching for a maximum value of the cross-correlation value in the weighted cross-correlation coefficient includes comparing a second cross-correlation value with a first cross-correlation value in the cross-correlation coefficient to obtain a maximum value in the first cross-correlation value and the second cross-correlation value, comparing a third cross-correlation value with the maximum value to obtain a maximum value in the third cross-correlation value and the maximum value, and in a cyclic order, comparing an $i^{th}$ cross-correlation value with a maximum value obtained through previous comparison to obtain a maximum value in the $i^{th}$ cross-correlation value and the maximum value obtained through previous comparison. It is assumed that i=i+1, and the step of comparing an $i^{th}$ cross-correlation value with a maximum value obtained through previous comparison is continuously performed until all cross-correlation values are compared, to obtain a maximum value in the cross-correlation values, where i is an integer greater than 2.

Optionally, the determining the inter-channel time difference of the current frame based on an index value corresponding to the maximum value includes using a sum of the index value corresponding to the maximum value and the minimum value of the inter-channel time difference as the inter-channel time difference of the current frame.

The cross-correlation coefficient can reflect a degree of cross correlation between two channel signals obtained after a delay is adjusted based on different inter-channel time differences, and there is a correspondence between an index value of the cross-correlation coefficient and an inter-channel time difference. Therefore, an audio coding device can determine the inter-channel time difference of the current frame based on an index value corresponding to a maximum value of the cross-correlation coefficient (with a highest degree of cross correlation).

In conclusion, according to the delay estimation method provided in this embodiment, the inter-channel time difference of the current frame is predicted based on the delay track estimation value of the current frame, and weighting is performed on the cross-correlation coefficient based on the delay track estimation value of the current frame and the adaptive window function of the current frame. The adaptive window function is the raised cosine-like window, and has the function of relatively enlarging the middle part and suppressing the edge part. Therefore, when weighting is performed on the cross-correlation coefficient based on the delay track estimation value of the current frame and the adaptive window function of the current frame, if an index value is closer to the delay track estimation value, a weighting coefficient is greater, avoiding a problem that a first cross-correlation coefficient is excessively smoothed, and if the index value is farther from the delay track estimation value, the weighting coefficient is smaller, avoiding a problem that a second cross-correlation coefficient is insufficiently smoothed. In this way, the adaptive window function adaptively suppresses a cross-correlation value corresponding to the index value, away from the delay track estimation value, in the cross-correlation coefficient, thereby improving accuracy of determining the inter-channel time difference in the weighted cross-correlation coefficient. The first cross-correlation coefficient is a cross-correlation value corresponding to an index value, near the delay track estimation value, in the cross-correlation coefficient, and the second cross-correlation coefficient is a cross-correlation value corresponding to an index value, away from the delay track estimation value, in the cross-correlation coefficient.

Steps 301 to 303 in the embodiment shown in FIG. 5 are described in detail below.

First, that the cross-correlation coefficient of the multichannel signal of the current frame is determined in step 301 is described.

(1) The audio coding device determines the cross-correlation coefficient based on a left channel time domain signal and a right channel time domain signal of the current frame.

A maximum value $T_{max}$ of the inter-channel time difference and a minimum value $T_{min}$ of the inter-channel time difference usually need to be preset in order to determine a calculation range of the cross-correlation coefficient. Both the maximum value $T_{max}$ of the inter-channel time difference and the minimum value $T_{min}$ of the inter-channel time difference are real numbers, and $T_{max}>T_{min}$. Values of $T_{max}$ and $T_{min}$ are related to a frame length, or values of $T_{max}$ and $T_{min}$ are related to a current sampling frequency.

Optionally, a maximum value L_NCSHIFT_DS of an absolute value of the inter-channel time difference is preset, to determine the maximum value $T_{max}$ of the inter-channel time difference and the minimum value $T_{min}$ of the inter-channel time difference. For example, the maximum value $T_{max}$ of the inter-channel time difference=L_NCSHIFT_DS, and the minimum value $T_{min}$ of the inter-channel time difference=−L_NCSHIFT_DS.

The values of $T_{max}$ and $T_{min}$ are not limited in this application. For example, if the maximum value L_NCSHIFT_DS of the absolute value of the inter-channel time difference is 40, $T_{max}=40$, and $T_{min}=-40$.

In an implementation, an index value of the cross-correlation coefficient is used to indicate a difference between the inter-channel time difference and the minimum value of the inter-channel time difference. In this case, determining the cross-correlation coefficient based on the left channel time domain signal and the right channel time domain signal of the current frame is represented using the following formulas.

In a case of $T_{min} \le 0$ and $0<T_{max}$, when $T_{min} \le i \le 0$, $$c(k) = \frac{1}{N+i}\sum_{j=0}^{N-1+i} \tilde{x}_R(j)\cdot\tilde{x}_L(j-i), \text{ where } k = i - T_{min}, \text{ and}$$

when $0 < i \le T_{max}$, $$c(k) = \frac{1}{N+i}\sum_{j=0}^{N-1-i} \tilde{x}_R(j)\cdot\tilde{x}_L(j+i), \text{ where } k = i - T_{min}.$$

In a case of $T_{min} \le 0$ and $T_{max} \le 0$, when $T_{min} \le i \le T_{max}$, $$c(k) = \frac{1}{N+i}\sum_{j=0}^{N-1-i}\tilde{x}_R(j)\cdot\tilde{x}_L(j-i), \text{ where } k = i - T_{min}.$$

In a case of $T_{min} \ge 0$ and $T_{max} \ge 0$, when $T_{min} \le i \le T_{max}$, $$c(k) = \frac{1}{N+i}\sum_{j=0}^{N-1-i}\tilde{x}_R(j)\cdot\tilde{x}_L(j+i), \text{ where } k = i - T_{min}.$$

N is a frame length, $\tilde{x}_L(j)$ is the left channel time domain signal of the current frame, $\tilde{x}_g(j)$ is the right channel time domain signal of the current frame, c(k) is the cross-correlation coefficient of the current frame, k is the index value of the cross-correlation coefficient, k is an integer not less than 0, and a value range of k is $[0, T_{max}-T_{min}]$.

It is assumed that $T_{max}=40$, and $T_{min}=-40$. In this case, the audio coding device determines the cross-correlation coefficient of the current frame using the calculation manner corresponding to the case that $T_{min} \le 0$ and $0 < T_{max}$. In this case, the value range of k is [0, 80].

In another implementation, the index value of the cross-correlation coefficient is used to indicate the inter-channel time difference. In this case, determining, by the audio coding device, the cross-correlation coefficient based on the maximum value of the inter-channel time difference and the minimum value of the inter-channel time difference is represented using the following formulas.

In a case of $T_{min} \le 0$ and $0 < T_{max}$, when $T_{min} \le i \le 0$, $$c(i) = \frac{1}{N+i}\sum_{j=0}^{N-1-i}\tilde{x}_R(j)\cdot\tilde{x}_L(j-i), \text{ and}$$

when $0 < i \le T_{max}$, $$c(i) = \frac{1}{N+i}\sum_{j=0}^{N-1-i}\tilde{x}_R(j)\cdot\tilde{x}_L(j+i).$$

In a case of $T_{min} \le 0$ and $T_{max} \le 0$, when $T_{min} \le i \le T_{max}$, $$c(i) = \frac{1}{N+i}\sum_{j=0}^{N-1+i}\tilde{x}_R(j)\cdot\tilde{x}_L(j-i).$$

In a case of $T_{min} \ge 0$ and $T_{max} \ge 0$, when $T_{min} \le i \le T_{max}$, $$c(i) = \frac{1}{N+i}\sum_{j=0}^{N-1-i}\tilde{x}_R(j)\cdot\tilde{x}_L(j+i).$$

N is a frame length, $\tilde{x}_L(j)$ is the left channel time domain signal of the current frame, $\tilde{x}_R(j)$ is the right channel time domain signal of the current frame, c(i) is the cross-correlation coefficient of the current frame, i is the index value of the cross-correlation coefficient, and a value range of i is $[T_{min}, T_{max}]$.

It is assumed that $T_{max}=40$, and $T_{min}=-40$. In this case, the audio coding device determines the cross-correlation coefficient of the current frame using the calculation formula corresponding to $T_{min} \le 0$ and $0 < T_{max}$. In this case, the value range of i is [−40, 40].

Second, the determining a delay track estimation value of the current frame in step 302 is described.

In a first implementation, delay track estimation is performed based on the buffered inter-channel time difference information of the at least one past frame using a linear regression method, to determine the delay track estimation value of the current frame.

This implementation is implemented using the following several steps.

(1) Generate M data pairs based on the inter-channel time difference information of the at least one past frame and a corresponding sequence number, where M is a positive integer.

A buffer stores inter-channel time difference information of M past frames.

Optionally, the inter-channel time difference information is an inter-channel time difference. Alternatively, the inter-channel time difference information is an inter-channel time difference smoothed value.

Optionally, inter-channel time differences that are of the M past frames and that are stored in the buffer follow a first in first out principle. In an embodiment, a buffer location of an inter-channel time difference that is buffered first and that is of a past frame is in the front, and a buffer location of an inter-channel time difference that is buffered later and that is of a past frame is in the back.

In addition, for the inter-channel time difference that is buffered later and that is of the past frame, the inter-channel time difference that is buffered first and that is of the past frame moves out of the buffer first.

Optionally, in this embodiment, each data pair is generated using inter-channel time difference information of each past frame and a corresponding sequence number.

A sequence number is referred to as a location of each past frame in the buffer. For example, if eight past frames are stored in the buffer, sequence numbers are 0, 1, 2, 3, 4, 5, 6, and 7 respectively.

For example, the generated M data pairs are $\{(x_0, y_0), (x_1, y_1), (x_2, y_2) \ldots (x_r, y_r), \ldots, \text{and } (x_{M-1}, y_{M-1})\}$. $(x_r, y_r)$ is an $(r+1)^{th}$ data pair, and $x_r$ is used to indicate a sequence number of the $(r+1)^{th}$ data pair, that is, $x_r=r$, and $y_r$ is used to indicate an inter-channel time difference that is of a past frame and that corresponds to the $(r+1)^{th}$ data pair, where r=0, 1, . . . , and (M−1).

Figure 9:
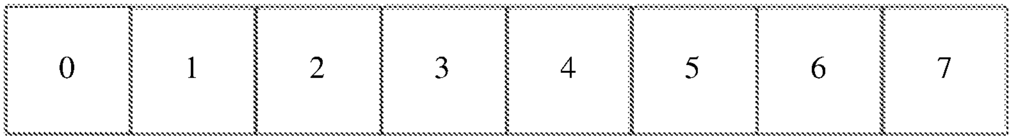
FIG. 9 is a schematic diagram of a buffer according to an example embodiment of this application.

FIG. 9 is a schematic diagram of eight buffered past frames. A location corresponding to each sequence number buffers an inter-channel time difference of one past frame. In this case, eight data pairs are $\{(x_0, y_0), (x_1, y_1), (x_2, y_2) \ldots (x_r, y_r), \ldots, \text{and } (x_7, y_7)\}$. In this case, r=0, 1, 2, 3, 4, 5, 6, and 7.

(2) Calculate a first linear regression parameter and a second linear regression parameter based on the M data pairs.

In this embodiment, it is assumed that $y_r$ in the data pairs is a linear function that is about $x_r$ and that has a measurement error of $\varepsilon_r$. The linear function is as follows.

$$y_r=\alpha+\beta*x_r+\varepsilon_r,$$

where α is the first linear regression parameter, β is the second linear regression parameter, and $\varepsilon_r$ is the measurement error.

The linear function needs to meet the following condition. A distance between the observed value $y_r$ (inter-channel time difference information actually buffered) corresponding to the observation point $x_r$ and an estimation value $\alpha+\beta*x_r$ calculated based on the linear function is the smallest, in an embodiment, minimization of a cost function Q (α, β) is met.

The cost function Q (α, β) is as follows.

$$Q(\alpha, \beta) = \sum_{r=0}^{M1} \varepsilon_r = \sum_{r=0}^{M1} (y_r - \alpha - \beta \cdot x_r).$$

To meet the foregoing condition, the first linear regression parameter and the second linear regression parameter in the linear function need to meet the following.

$$\beta = \frac{\hat{XY} - \hat{X} * \hat{Y}}{\hat{X^2} - (\hat{X})^2};$$

$$\alpha = (\hat{Y} - \beta * \hat{X})/IV;$$

$$\hat{X} = \sum_{r=0}^{M-1} X_r;$$

$$\hat{Y} = \sum_{r=0}^{M-1} y_r;$$

$$\hat{X^2} = \sum_{r=0}^{M-1} x_r^2; \text{ and}$$

$$\hat{XY} = \sum_{r=0}^{M-1} x_r * y_r,$$

where $x_r$ is used to indicate the sequence number of the $(r+1)^{th}$ data pair in the M data pairs, and $y_r$ is inter-channel time difference information of the $(r+1)^{th}$ data pair.

(3) Obtain the delay track estimation value of the current frame based on the first linear regression parameter and the second linear regression parameter.

An estimation value corresponding to a sequence number of an $(M+1)^{th}$ data pair is calculated based on the first linear regression parameter and the second linear regression parameter, and the estimation value is determined as the delay track estimation value of the current frame. A formula is as follows.

$$\text{reg\_prv\_corr} = \alpha + \beta * M,$$

where reg_prv_corr represents the delay track estimation value of the current frame, M is the sequence number of the $(M+1)^{th}$ data pair, and $\alpha+\beta*M$ is the estimation value of the $(M+1)^{th}$ data pair.

For example, M=8. After α and β are determined based on the eight generated data pairs, an inter-channel time difference in a ninth data pair is estimated based on α and β, and the inter-channel time difference in the ninth data pair is determined as the delay track estimation value of the current frame, that is, reg_prv_corr=α+β*8.

Optionally, in this embodiment, only a manner of generating a data pair using a sequence number and an inter-channel time difference is used as an example for description. In an embodiment, the data pair may alternatively be generated in another manner. This is not limited in this embodiment.

In a second implementation, delay track estimation is performed based on the buffered inter-channel time difference information of the at least one past frame using a weighted linear regression method, to determine the delay track estimation value of the current frame.

This implementation is implemented using the following several steps.

(1) Generate M data pairs based on the inter-channel time difference information of the at least one past frame and a corresponding sequence number, where M is a positive integer.

This step is the same as the related description in step (1) in the first implementation, and details are not described herein in this embodiment.

(2) Calculate a first linear regression parameter and a second linear regression parameter based on the M data pairs and weighting coefficients of the M past frames.

Optionally, the buffer stores not only the inter-channel time difference information of the M past frames, but also stores the weighting coefficients of the M past frames. A weighting coefficient is used to calculate a delay track estimation value of a corresponding past frame.

Optionally, a weighting coefficient of each past frame is obtained through calculation based on a smoothed inter-channel time difference estimation deviation of the past frame. Alternatively, a weighting coefficient of each past frame is obtained through calculation based on an inter-channel time difference estimation deviation of the past frame.

In this embodiment, it is assumed that $y_r$ in the data pairs is a linear function that is about $x_r$ and that has a measurement error of $\varepsilon_r$. The linear function is as follows.

$$y_r = \alpha + \beta * x_r + \varepsilon_r,$$

where α is the first linear regression parameter, β is the second linear regression parameter, and $\varepsilon_r$ is the measurement error.

The linear function needs to meet the following condition. A weighting distance between the observed value $y_r$ (inter-channel time difference information actually buffered) corresponding to the observation point $x_r$ and an estimation value $\alpha+\beta*x_r$ calculated based on the linear function is the smallest, in an embodiment, minimization of a cost function Q (α, β) is met.

The cost function Q (α, β) is as follows.

$$Q(\alpha, \beta) = \sum_{r=0}^{M-1} w_r \cdot \varepsilon_r = \sum_{r=0}^{M-1} w_r \cdot (y_r - \alpha - \beta \cdot x_r);$$

where $w_r$ is a weighting coefficient of a past frame corresponding to an $r^{th}$ data pair.

To meet the foregoing condition, the first linear regression parameter and the second linear regression parameter in the linear function need to meet the following.

$$\beta = \frac{\hat{W} * \hat{XY} - \hat{X} * \hat{Y}}{\hat{W} * \hat{X^2} - (\hat{X})^2};$$

$$\alpha = \frac{\hat{Y} - \beta * \hat{X}}{\hat{W}};$$

-continued $$\hat{X}=\sum_{r=0}^{M-1} w_r * x_r;$$

$$\hat{Y}=\sum_{r=0}^{M-1} w_r * y_r;$$

$$\hat{W}=\sum_{r=0}^{M-1} w_r;$$

$$\hat{X^2}=\sum_{r=0}^{M-1} w_r * x_r^2; \text{ and}$$

$$\hat{XY}=\sum_{r=0}^{M-1} w_r * x_r * y_r;$$

where $x_r$ is used to indicate a sequence number of the $(r+1)^{th}$ data pair in the M data pairs, $y_r$ is inter-channel time difference information in the $(r+1)^{th}$ data pair, $w_r$ is a weighting coefficient corresponding to the inter-channel time difference information in the $(r+1)^{th}$ data pair in at least one past frame.

(3) Obtain the delay track estimation value of the current frame based on the first linear regression parameter and the second linear regression parameter.

This step is the same as the related description in step (3) in the first implementation, and details are not described herein in this embodiment.

Optionally, in this embodiment, only a manner of generating a data pair using a sequence number and an inter-channel time difference is used as an example for description. In an embodiment, the data pair may alternatively be generated in another manner. This is not limited in this embodiment.

It should be noted that in this embodiment, description is provided using an example in which a delay track estimation value is calculated only using the linear regression method or in the weighted linear regression manner. In an embodiment, the delay track estimation value may alternatively be calculated in another manner. This is not limited in this embodiment. For example, the delay track estimation value is calculated using a B-spline (B-spline) method, or the delay track estimation value is calculated using a cubic spline method, or the delay track estimation value is calculated using a quadratic spline method.

Third, the determining an adaptive window function of the current frame in step 303 is described.

In this embodiment, two manners of calculating the adaptive window function of the current frame are provided. In a first manner, the adaptive window function of the current frame is determined based on a smoothed inter-channel time difference estimation deviation of a previous frame. In this case, inter-channel time difference estimation deviation information is the smoothed inter-channel time difference estimation deviation, and the raised cosine width parameter and the raised cosine height bias of the adaptive window function are related to the smoothed inter-channel time difference estimation deviation. In a second manner, the adaptive window function of the current frame is determined based on the inter-channel time difference estimation deviation of the current frame. In this case, the inter-channel time difference estimation deviation information is the inter-channel time difference estimation deviation, and the raised cosine width parameter and the raised cosine height bias of the adaptive window function are related to the inter-channel time difference estimation deviation.

The two manners are separately described below.

This first manner is implemented using the following several steps.

(1) Calculate a first raised cosine width parameter based on the smoothed inter-channel time difference estimation deviation of the previous frame of the current frame.

Because accuracy of calculating the adaptive window function of the current frame using a multi-channel signal near the current frame is relatively high, in this embodiment, description is provided using an example in which the adaptive window function of the current frame is determined based on the smoothed inter-channel time difference estimation deviation of the previous frame of the current frame.

Optionally, the smoothed inter-channel time difference estimation deviation of the previous frame of the current frame is stored in the buffer.

This step is represented using the following formulas.

win_width1=TRUNC(width_par1*(*A***L*_NCSHIFT_*DS*+1)), and
width_par1=*a*_width1*smooth_dist_reg+*b*_width1, where

*a*_width1=(*xh*_width1−*xl*_width1)/(*yh*_dist1−*yl*_dist1), *b*_width1=*xh*_width1−*a*_width1**yh*_dist1, where win_width1 is the first raised cosine width parameter, TRUNC indicates rounding a value, L_NCSHIFT_DS is the maximum value of the absolute value of the inter-channel time difference, A is a preset constant, and A is greater than or equal to 4.

xh_width1 is an upper limit value of the first raised cosine width parameter, for example, 0.25 in FIG. 7, xl_width1 is a lower limit value of the first raised cosine width parameter, for example, 0.04 in FIG. 7, yh_dist1 is a smoothed inter-channel time difference estimation deviation corresponding to the upper limit value of the first raised cosine width parameter, for example, 3.0 corresponding to 0.25 in FIG. 7, yl_dist1 is a smoothed inter-channel time difference estimation deviation corresponding to the lower limit value of the first raised cosine width parameter, for example, 1.0 corresponding to 0.04 in FIG. 7.

smooth_dist_reg is the smoothed inter-channel time difference estimation deviation of the previous frame of the current frame, and xh_width1, xl_width1, yh_dist1, and yl_dist1 are all positive numbers.

Optionally, in the foregoing formula, b_width1=xh_width1−a_width1*yh_dist1 may be replaced with b_width1=xl_width1−a_width1*yl_dist1.

Optionally, in this step, width_par1=min(width_par1, xh_width1), and width_par1=max(width_par1, xl_width1), where min represents taking of a minimum value, and max represents taking of a maximum value. In an embodiment, when width_par1 obtained through calculation is greater than xh_width1, width_par1 is set to xh_width1, or when width_par1 obtained through calculation is less than xl_width1, width_par1 is set to xl_width1.

In this embodiment, when width_par1 is greater than the upper limit value of the first raised cosine width parameter, width_par1 is limited to be the upper limit value of the first raised cosine width parameter, or when width_par1 is less than the lower limit value of the first raised cosine width parameter, width_par1 is limited to the lower limit value of the first raised cosine width parameter in order to ensure that a value of width_par1 does not exceed a normal value range of the raised cosine width parameter, thereby ensuring accuracy of a calculated adaptive window function.

(2) Calculate a first raised cosine height bias based on the smoothed inter-channel time difference estimation deviation of the previous frame of the current frame.

This step is represented using the following formula.

$$win\_bias1=a\_bias1*smooth\_dist\_reg+b\_bias1, \text{ where}$$

$$a\_bias1=(xh\_bias1-xl\_bias1)/(yh\_dist2-yl\_dist2), \text{ and } b\_bias1=xh\_bias1-a\_bias1*yh\_dist2,$$

where win_bias1 is the first raised cosine height bias, xh_bias1 is an upper limit value of the first raised cosine height bias, for example, 0.7 in FIG. 8, xl_bias1 is a lower limit value of the first raised cosine height bias, for example, 0.4 in FIG. 8, yh_dist2 is a smoothed inter-channel time difference estimation deviation corresponding to the upper limit value of the first raised cosine height bias, for example, 3.0 corresponding to 0.7 in FIG. 8, yl_dist2 is a smoothed inter-channel time difference estimation deviation corresponding to the lower limit value of the first raised cosine height bias, for example, 1.0 corresponding to 0.4 in FIG. 8, smooth_dist_reg is the smoothed inter-channel time difference estimation deviation of the previous frame of the current frame, and yh_dist2, yl_dist2, xh_bias1, and xl_bias1 are all positive numbers.

Optionally, in the foregoing formula, b_bias1=xh_bias1−a_bias1*yh_dist2 may be replaced with b_bias1=xl_bias1−a_bias1*yl_dist2.

Optionally, in this embodiment, win_bias1=min (win_bias1, xh_bias1), and win_bias1=max(win_bias1, xl_bias1). In an embodiment, when win_bias1 obtained through calculation is greater than xh_bias1, win_bias1 is set to xh_bias1, or when win_bias1 obtained through calculation is less than xl_bias1, win_bias1 is set to xl_bias1.

Optionally, yh_dist2=yh_dist1, and yl_dist2=yl_dist1.

(3) Determine the adaptive window function of the current frame based on the first raised cosine width parameter and the first raised cosine height bias.

The first raised cosine width parameter and the first raised cosine height bias are brought into the adaptive window function in step 303 to obtain the following calculation formulas.

$$\text{When } 0\le k\le TRUNC(A*L\_NCSHIFT\_DS/2)-2*win\_width1-1,\ loc\_weight\_win(k)=win\_bias1;$$

$$\text{when } TRUNC(A*L\_NCSHIFT\_DS/2)-2*win\_width1\le k\le TRUNC(A*L\_NCSHIFT\_DS/2)+2*win\_width1-1,$$

$$loc\_weight\_win(k)=0.5*(1+win\_bias1)+0.5*(1-win\_bias1)*\cos(\pi*(k-TRUNC(A*L\_NCSHIFT\_DS/2))/(2*win\_width1)); \text{ and}$$

$$\text{when } TRUNC(A*L\_NCSHIFT\_DS/2)+2*win\_width1\le k\le A*L\_NCSHIFT\_DS,\ loc\_weight\_win(k)=win\_bias1,$$

where loc_weight_win(k) is used to represent the adaptive window function, where k=0, 1, . . . , A*L_NCSHIFT_DS, A is the preset constant greater than or equal to 4, for example, A=4, L_NCSHIFT_DS is the maximum value of the absolute value of the inter-channel time difference, win_width1 is the first raised cosine width parameter, and win_bias1 is the first raised cosine height bias.

In this embodiment, the adaptive window function of the current frame is calculated using the smoothed inter-channel time difference estimation deviation of the previous frame such that a shape of the adaptive window function is adjusted based on the smoothed inter-channel time difference estimation deviation, thereby avoiding a problem that a generated adaptive window function is inaccurate due to an error of the delay track estimation of the current frame, and improving accuracy of generating an adaptive window function.

Optionally, after the inter-channel time difference of the current frame is determined based on the adaptive window function determined in the first manner, the smoothed inter-channel time difference estimation deviation of the current frame may be further determined based on the smoothed inter-channel time difference estimation deviation of the previous frame of the current frame, the delay track estimation value of the current frame, and the inter-channel time difference of the current frame.

Optionally, the smoothed inter-channel time difference estimation deviation of the previous frame of the current frame in the buffer is updated based on the smoothed inter-channel time difference estimation deviation of the current frame.

Optionally, after the inter-channel time difference of the current frame is determined each time, the smoothed inter-channel time difference estimation deviation of the previous frame of the current frame in the buffer is updated based on the smoothed inter-channel time difference estimation deviation of the current frame.

Optionally, updating the smoothed inter-channel time difference estimation deviation of the previous frame of the current frame in the buffer based on the smoothed inter-channel time difference estimation deviation of the current frame includes replacing the smoothed inter-channel time difference estimation deviation of the previous frame of the current frame in the buffer with the smoothed inter-channel time difference estimation deviation of the current frame.

The smoothed inter-channel time difference estimation deviation of the current frame is obtained through calculation using the following calculation formulas.

$$smooth\_dist\_reg\_update=(1-\gamma)*smooth\_dist\_reg+\gamma*dist\_reg', \text{ and } dist\_reg'=|reg\_prv\_corr-cur\_itd|,$$

where smooth_dist_reg_update is the smoothed inter-channel time difference estimation deviation of the current frame, γ is a first smoothing factor, and 0<γ<1, for example, γ=0.02, smooth_dist_reg is the smoothed inter-channel time difference estimation deviation of the previous frame of the current frame, reg_prv_corr is the delay track estimation value of the current frame, and cur_itd is the inter-channel time difference of the current frame.

In this embodiment, after the inter-channel time difference of the current frame is determined, the smoothed inter-channel time difference estimation deviation of the current frame is calculated. When an inter-channel time difference of a next frame is to be determined, an adaptive window function of the next frame can be determined using the smoothed inter-channel time difference estimation deviation of the current frame, thereby ensuring accuracy of determining the inter-channel time difference of the next frame.

Optionally, after the inter-channel time difference of the current frame is determined based on the adaptive window function determined in the foregoing first manner, the buffered inter-channel time difference information of the at least one past frame may be further updated.

In an update manner, the buffered inter-channel time difference information of the at least one past frame is updated based on the inter-channel time difference of the current frame.

In another update manner, the buffered inter-channel time difference information of the at least one past frame is updated based on an inter-channel time difference smoothed value of the current frame.

Optionally, the inter-channel time difference smoothed value of the current frame is determined based on the delay track estimation value of the current frame and the inter-channel time difference of the current frame.

For example, based on the delay track estimation value of the current frame and the inter-channel time difference of the current frame, the inter-channel time difference smoothed value of the current frame may be determined using the following formula.

$$cur\_itd\_smooth=\varphi*reg\_prv\_corr+(1-\varphi)*cur\_itd,$$

where cur_itd_smooth is the inter-channel time difference smoothed value of the current frame, φ is a second smoothing factor, reg_prv_corr is the delay track estimation value of the current frame, and cur_itd is the inter-channel time difference of the current frame. φ is a constant greater than or equal to 0 and less than or equal to 1.

The updating the buffered inter-channel time difference information of the at least one past frame includes adding the inter-channel time difference of the current frame or the inter-channel time difference smoothed value of the current frame to the buffer.

Optionally, for example, the inter-channel time difference smoothed value in the buffer is updated. The buffer stores inter-channel time difference smoothed values corresponding to a fixed quantity of past frames, for example, the buffer stores inter-channel time difference smoothed values of eight past frames. If the inter-channel time difference smoothed value of the current frame is added to the buffer, an inter-channel time difference smoothed value of a past frame that is originally located in a first bit (a head of a queue) in the buffer is deleted. Correspondingly, an inter-channel time difference smoothed value of a past frame that is originally located in a second bit is updated to the first bit. By analogy, the inter-channel time difference smoothed value of the current frame is located in a last bit (a tail of the queue) in the buffer.

Figure 10:
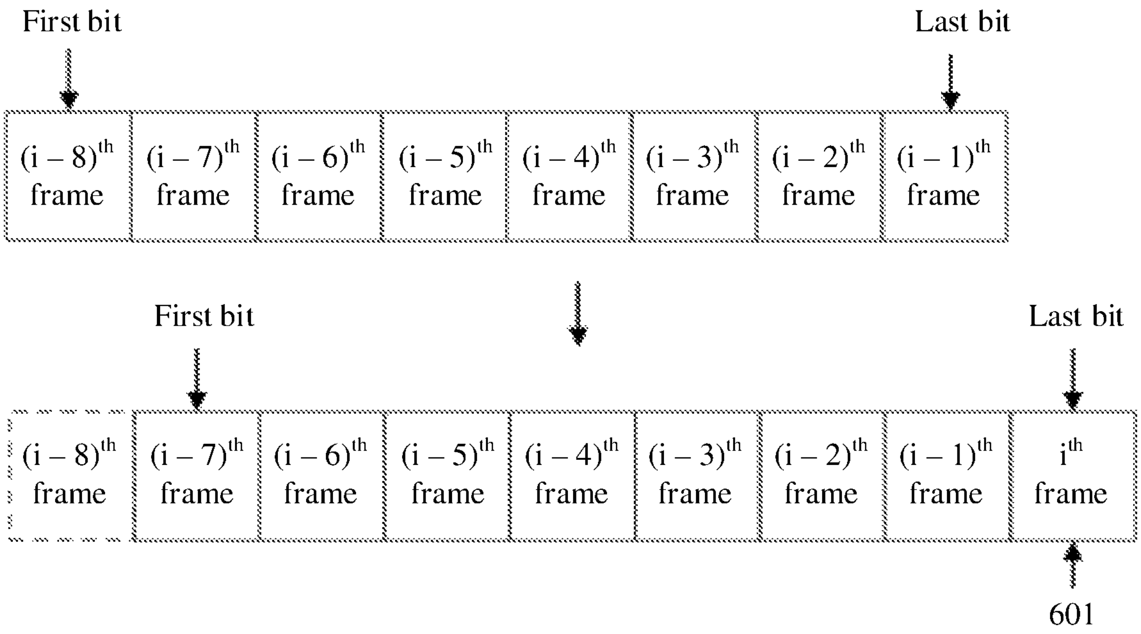
FIG. 10 is a schematic diagram of buffer updating according to an example embodiment of this application.

Reference is made to a buffer updating process shown in FIG. 10. It is assumed that the buffer stores inter-channel time difference smoothed values of eight past frames. Before an inter-channel time difference smoothed value 601 of the current frame is added to the buffer (that is, the eight past frames corresponding to the current frame), an inter-channel time difference smoothed value of an $(i-8)^{th}$ frame is buffered in a first bit, and an inter-channel time difference smoothed value of an $(i-7)^{th}$ frame is buffered in a second bit, . . . , and an inter-channel time difference smoothed value of an $(i-1)^{th}$ frame is buffered in an eighth bit.

If the inter-channel time difference smoothed value 601 of the current frame is added to the buffer, the first bit (which is represented by a dashed box in the figure) is deleted, a sequence number of the second bit becomes a sequence number of the first bit, a sequence number of the third bit becomes the sequence number of the second bit, . . . , and a sequence number of the eighth bit becomes a sequence number of a seventh bit. The inter-channel time difference smoothed value 601 of the current frame (an $i^{th}$ frame) is located in the eighth bit, to obtain eight past frames corresponding to a next frame.

Optionally, after the inter-channel time difference smoothed value of the current frame is added to the buffer, the inter-channel time difference smoothed value buffered in the first bit may not be deleted, instead, inter-channel time difference smoothed values in the second bit to a ninth bit are directly used to calculate an inter-channel time difference of a next frame. Alternatively, inter-channel time difference smoothed values in the first bit to a ninth bit are used to calculate an inter-channel time difference of a next frame. In this case, a quantity of past frames corresponding to each current frame is variable. A buffer update manner is not limited in this embodiment.

In this embodiment, after the inter-channel time difference of the current frame is determined, the inter-channel time difference smoothed value of the current frame is calculated. When a delay track estimation value of the next frame is to be determined, the delay track estimation value of the next frame can be determined using the inter-channel time difference smoothed value of the current frame. This ensures accuracy of determining the delay track estimation value of the next frame.

Optionally, if the delay track estimation value of the current frame is determined based on the foregoing second implementation of determining the delay track estimation value of the current frame, after the buffered inter-channel time difference smoothed value of the at least one past frame is updated, a buffered weighting coefficient of the at least one past frame may be further updated. The weighting coefficient of the at least one past frame is a weighting coefficient in the weighted linear regression method.

In the first manner of determining the adaptive window function, the updating the buffered weighting coefficient of the at least one past frame includes calculating a first weighting coefficient of the current frame based on the smoothed inter-channel time difference estimation deviation of the current frame, and updating a buffered first weighting coefficient of the at least one past frame based on the first weighting coefficient of the current frame.

In this embodiment, for related descriptions of buffer updating, refer to FIG. 10. Details are not described again herein in this embodiment.

The first weighting coefficient of the current frame is obtained through calculation using the following calculation formulas.

$$wgt\_par1=a\_wgt1*smooth\_dist\_reg\_update+b\_wgt1,$$

$$a\_wgt1=(xl\_wgt1-xh\_wgt1)/(yh\_dist1'-yl\_dist1'), \text{ and}$$

$$b\_wgt1=xl\_wgt1-a\_wgt1*yh\_dist1',$$

where wgt_par1 is the first weighting coefficient of the current frame, smooth_dist_reg_update is the smoothed inter-channel time difference estimation deviation of the current frame, xh_wgt is an upper limit value of the first weighting coefficient, xl_wgt is a lower limit value of the first weighting coefficient, yh_dist1' is a smoothed inter-channel time difference estimation deviation corresponding to the upper limit value of the first weighting coefficient, yl_dist1' is a smoothed inter-channel time difference estimation deviation corresponding to the lower limit value of the first weighting coefficient, and yh_dist1', yl_dist1', xh_wgt1, and xl_wgt1 are all positive numbers.

Optionally, wgt_par1=min(wgt_par1, xh_wgt1), and wgt_par1=max(wgt_par1, xl_wgt1).

Optionally, in this embodiment, values of yh_dist1', yl_dist1', xh_wgt1, and xl_wgt1 are not limited. For example, xl_wgt1=0.05, xh_wgt1=1.0, yl_dist1'=2.0, and yh_dist1'=1.0.

Optionally, in the foregoing formula, b_wgt1=xl_wgt1−a_wgt1*yh_dist1' may be replaced with b_wgt1=xh_wgt1−a_wgt1*yl_dist1'.

In this embodiment, xh_wgt1>xl_wgt1, and yh_dist1'<yl_dist1'.

In this embodiment, when wgt_par1 is greater than the upper limit value of the first weighting coefficient, wgt_par1 is limited to be the upper limit value of the first weighting coefficient, or when wgt_par1 is less than the lower limit value of the first weighting coefficient, wgt_par1 is limited to the lower limit value of the first weighting coefficient in order to ensure that a value of wgt_par1 does not exceed a normal value range of the first weighting coefficient, thereby ensuring accuracy of the calculated delay track estimation value of the current frame.

In addition, after the inter-channel time difference of the current frame is determined, the first weighting coefficient of the current frame is calculated. When the delay track estimation value of the next frame is to be determined, the delay track estimation value of the next frame can be determined using the first weighting coefficient of the current frame, thereby ensuring accuracy of determining the delay track estimation value of the next frame.

In the second manner, an initial value of the inter-channel time difference of the current frame is determined based on the cross-correlation coefficient, the inter-channel time difference estimation deviation of the current frame is calculated based on the delay track estimation value of the current frame and the initial value of the inter-channel time difference of the current frame, and the adaptive window function of the current frame is determined based on the inter-channel time difference estimation deviation of the current frame.

Optionally, the initial value of the inter-channel time difference of the current frame is a maximum value that is of a cross-correlation value in the cross-correlation coefficient and that is determined based on the cross-correlation coefficient of the current frame, and an inter-channel time difference determined based on an index value corresponding to the maximum value.

Optionally, determining the inter-channel time difference estimation deviation of the current frame based on the delay track estimation value of the current frame and the initial value of the inter-channel time difference of the current frame is represented using the following formula.

dist_reg=|reg_prv_corr|cur_itd_init|, where dist_reg is the inter-channel time difference estimation deviation of the current frame, reg_prv_corr is the delay track estimation value of the current frame, and cur_itd_init is the initial value of the inter-channel time difference of the current frame.

Based on the inter-channel time difference estimation deviation of the current frame, determining the adaptive window function of the current frame is implemented using the following steps.

(1) Calculate a second raised cosine width parameter based on the inter-channel time difference estimation deviation of the current frame.

This step may be represented using the following formulas.

win_width2=TRUNC(width_par2*(*A***L*_NCSHIFT_*DS*+1)), and width_par2=*a*_width2*dist_reg+*b*_width2, where

*a*_width2=(*xh*_width2−*xl*_width2)/(*yh*_dist3−*yl*_dist3), and *b*_width2=*xh*_width2−*a*_width2**yh*_dist3, where win_width2 is the second raised cosine width parameter, TRUNC indicates rounding a value, L_NCSHIFT_DS is a maximum value of an absolute value of an inter-channel time difference, A is a preset constant, A is greater than or equal to 4, A*L_NCSHIFT_DS+1 is a positive integer greater than zero, xh_width2 is an upper limit value of the second raised cosine width parameter, xl_width2 is a lower limit value of the second raised cosine width parameter, yh_dist3 is an inter-channel time difference estimation deviation corresponding to the upper limit value of the second raised cosine width parameter, yl_dist3 is an inter-channel time difference estimation deviation corresponding to the lower limit value of the second raised cosine width parameter, dist_reg is the inter-channel time difference estimation deviation, xh_width2, xl_width2, yh_dist3, and yl_dist3 are all positive numbers.

Optionally, in this step, b_width2=xh_width2−a_width2*yh_dist3 may be replaced with b_width2=xl_width2−a_width2*yl_dist3.

Optionally, in this step, width_par2=min(width_par2, xh_width2), and width_par2=max(width_par2, xl_width2), where min represents taking of a minimum value, and max represents taking of a maximum value. In an embodiment, when width_par2 obtained through calculation is greater than xh_width2, width_par2 is set to xh_width2, or when width_par2 obtained through calculation is less than xl_width2, width_par2 is set to xl_width2.

In this embodiment, when width_par2 is greater than the upper limit value of the second raised cosine width parameter, width_par2 is limited to be the upper limit value of the second raised cosine width parameter, or when width_par2 is less than the lower limit value of the second raised cosine width parameter, width_par2 is limited to the lower limit value of the second raised cosine width parameter in order to ensure that a value of width_par2 does not exceed a normal value range of the raised cosine width parameter, thereby ensuring accuracy of a calculated adaptive window function.

(2) Calculate a second raised cosine height bias based on the inter-channel time difference estimation deviation of the current frame.

This step may be represented using the following formula.

win_bias2=*a*_bias2*dist_reg+*b*_bias2, where

*a*_bias2=(*xh*_bias2−*xl*_bias2)/(*yh*_dist4−*yl*_dist4), and *b*_bias2=*xh*_bias2−*a*_bias2**yh*_dist4, where win_bias2 is the second raised cosine height bias, xh_bias2 is an upper limit value of the second raised cosine height bias, xl_bias2 is a lower limit value of the second raised cosine height bias, yh_dist4 is an inter-channel time difference estimation deviation corresponding to the upper limit value of the second raised cosine height bias, yl_dist4 is an inter-channel time difference estimation deviation corresponding to the lower limit value of the second raised cosine height bias, dist_reg is the inter-channel time difference estimation deviation, and yh_dist4, yl_dist4, xh_bias2, and xl_bias2 are all positive numbers.

Optionally, in this step, b_bias2=xh_bias2−a_bias2*yh_dist4 may be replaced with b_bias2=xl_bias2−a_bias2*yl_dist4.

Optionally, in this embodiment, win_bias2=min(win_bias2, xh_bias2), and win_bias2=max(win_bias2, xl_bias2). In an embodiment, when win_bias2 obtained through calculation is greater than xh_bias2, win_bias2 is set to xh_bias2, or when win_bias2 obtained through calculation is less than xl_bias2, win_bias2 is set to xl_bias2.

Optionally, yh_dist4=yh_dist3, and yl_dist4=yl_dist3.

(3) The audio coding device determines the adaptive window function of the current frame based on the second raised cosine width parameter and the second raised cosine height bias.

The audio coding device brings the second raised cosine width parameter and the second raised cosine height bias into the adaptive window function in step 303 to obtain the following calculation formulas.

When 0≤k≤TRUNC(A*L_NCSHIFT_DS/2)−2*win_width2−1, loc_weight_win(k)=win_bias2;

when TRUNC(A*L_NCSHIFT_DS/2)−2*win_width2≤k≤TRUNC(A*L_NCSHIFT_DS/2)+2*win_width2−1, loc_weight_win(k)=0.5*(1+win_bias2)+0.5*(1−win_bias2)*cos(π*(k−TRUNC(A*L_NCSHIFT_DS/2))/(2*win_width2)); and when TRUNC(A*L_NCSHIFT_DS/2)+2*win_width2≤k≤A*L_NCSHIFT_DS, loc_weight_win(k)=win_bias2, where loc_weight_win(k) is used to represent the adaptive window function, where k=0, 1, . . . , A*L_NCSHIFT_DS, A is the preset constant greater than or equal to 4, for example, A=4, L_NCSHIFT_DS is the maximum value of the absolute value of the inter-channel time difference, win_width2 is the second raised cosine width parameter, and win_bias2 is the second raised cosine height bias.

In this embodiment, the adaptive window function of the current frame is determined based on the inter-channel time difference estimation deviation of the current frame, and when the smoothed inter-channel time difference estimation deviation of the previous frame does not need to be buffered, the adaptive window function of the current frame can be determined, thereby saving a storage resource.

Optionally, after the inter-channel time difference of the current frame is determined based on the adaptive window function determined in the foregoing second manner, the buffered inter-channel time difference information of the at least one past frame may be further updated. For related descriptions, refer to the first manner of determining the adaptive window function. Details are not described again herein in this embodiment.

Optionally, if the delay track estimation value of the current frame is determined based on the second implementation of determining the delay track estimation value of the current frame, after the buffered inter-channel time difference smoothed value of the at least one past frame is updated, a buffered weighting coefficient of the at least one past frame may be further updated.

In the second manner of determining the adaptive window function, the weighting coefficient of the at least one past frame is a second weighting coefficient of the at least one past frame.

Updating the buffered weighting coefficient of the at least one past frame includes calculating a second weighting coefficient of the current frame based on the inter-channel time difference estimation deviation of the current frame, and updating a buffered second weighting coefficient of the at least one past frame based on the second weighting coefficient of the current frame.

Calculating the second weighting coefficient of the current frame based on the inter-channel time difference estimation deviation of the current frame is represented using the following formulas.

wgt_par2=a_wgt2*dist_reg+b_wgt2, a_wgt2=(xl_wgt2−xh_wgt2)/(yh_dist2'−yl_dist2'), and b_wgt2=xl_wgt2−a_wgt2*yh_dist2', where wgt_par2 is the second weighting coefficient of the current frame, dist_reg is the inter-channel time difference estimation deviation of the current frame, xh_wgt2 is an upper limit value of the second weighting coefficient, xl_wgt2 is a lower limit value of the second weighting coefficient, yh_dist2' is an inter-channel time difference estimation deviation corresponding to the upper limit value of the second weighting coefficient, yl_dist2' is an inter-channel time difference estimation deviation corresponding to the lower limit value of the second weighting coefficient, and yh_dist2', yl_dist2', xh_wgt2, and xl_wgt2 are all positive numbers.

Optionally, wgt_par2=min(wgt_par2, xh_wgt2), and wgt_par2=max(wgt_par2, xl_wgt2).

Optionally, in this embodiment, values of yh_dist2', yl_dist2', xh_wgt2, and xl_wgt2 are not limited. For example, xl_wgt2=0.05, xh_wgt2=1.0, yl_dist2'=2.0, and yh_dist2'=1.0.

Optionally, in the foregoing formula, b_wgt2=xl_wgt2−a_wgt2*yh_dist2' may be replaced with b_wgt2=xh_wgt2−a_wgt2*yl_dist2'.

In this embodiment, xh_wgt2>x2_wgt1, and yh_dist2'<yl_dist2'.

In this embodiment, when wgt_par2 is greater than the upper limit value of the second weighting coefficient, wgt_par2 is limited to be the upper limit value of the second weighting coefficient, or when wgt_par2 is less than the lower limit value of the second weighting coefficient, wgt_par2 is limited to the lower limit value of the second weighting coefficient in order to ensure that a value of wgt_par2 does not exceed a normal value range of the second weighting coefficient, thereby ensuring accuracy of the calculated delay track estimation value of the current frame.

In addition, after the inter-channel time difference of the current frame is determined, the second weighting coefficient of the current frame is calculated. When the delay track estimation value of the next frame is to be determined, the delay track estimation value of the next frame can be determined using the second weighting coefficient of the current frame, thereby ensuring accuracy of determining the delay track estimation value of the next frame.

Optionally, in the foregoing embodiments, the buffer is updated regardless of whether the multi-channel signal of the current frame is a valid signal. For example, the inter-channel time difference information of the at least one past frame and/or the weighting coefficient of the at least one past frame in the buffer are/is updated.

Optionally, the buffer is updated only when the multi-channel signal of the current frame is a valid signal. In this way, validity of data in the buffer is improved.

The valid signal is a signal whose energy is higher than preset energy, and/or belongs to preset type, for example, the valid signal is a speech signal, or the valid signal is a periodic signal.

In this embodiment, a voice activity detection (VAD) algorithm is used to detect whether the multi-channel signal of the current frame is an active frame. If the multi-channel signal of the current frame is an active frame, it indicates that the multi-channel signal of the current frame is the valid signal. If the multi-channel signal of the current frame is not an active frame, it indicates that the multi-channel signal of the current frame is not the valid signal.

In a manner, it is determined, based on a voice activation detection result of the previous frame of the current frame, whether to update the buffer.

When the voice activation detection result of the previous frame of the current frame is the active frame, it indicates that it is of great possibility that the current frame is the active frame. In this case, the buffer is updated. When the voice activation detection result of the previous frame of the current frame is not the active frame, it indicates that it is of great possibility that the current frame is not the active frame. In this case, the buffer is not updated.

Optionally, the voice activation detection result of the previous frame of the current frame is determined based on a voice activation detection result of a primary channel signal of the previous frame of the current frame and a voice activation detection result of a secondary channel signal of the previous frame of the current frame.

If both the voice activation detection result of the primary channel signal of the previous frame of the current frame and the voice activation detection result of the secondary channel signal of the previous frame of the current frame are active frames, the voice activation detection result of the previous frame of the current frame is the active frame. If the voice activation detection result of the primary channel signal of the previous frame of the current frame and/or the voice activation detection result of the secondary channel signal of the previous frame of the current frame are/is not active frames/an active frame, the voice activation detection result of the previous frame of the current frame is not the active frame.

In another manner, it is determined, based on a voice activation detection result of the current frame, whether to update the buffer.

When the voice activation detection result of the current frame is an active frame, it indicates that it is of great possibility that the current frame is the active frame. In this case, the audio coding device updates the buffer. When the voice activation detection result of the current frame is not an active frame, it indicates that it is of great possibility that the current frame is not the active frame. In this case, the audio coding device does not update the buffer.

Optionally, the voice activation detection result of the current frame is determined based on voice activation detection results of a plurality of channel signals of the current frame.

If the voice activation detection results of the plurality of channel signals of the current frame are all active frames, the voice activation detection result of the current frame is the active frame. If a voice activation detection result of at least one channel of channel signal of the plurality of channel signals of the current frame is not the active frame, the voice activation detection result of the current frame is not the active frame.

It should be noted that, in this embodiment, description is provided using an example in which the buffer is updated using only a criterion about whether the current frame is the active frame. In an embodiment, the buffer may alternatively be updated based on at least one of unvoicing or voicing, period or aperiodic, transient or non-transient, and speech or non-speech of the current frame.

For example, if both the primary channel signal and the secondary channel signal of the previous frame of the current frame are voiced, it indicates that there is a great probability that the current frame is voiced. In this case, the buffer is updated. If at least one of the primary channel signal and the secondary channel signal of the previous frame of the current frame is unvoiced, there is a great probability that the current frame is not voiced. In this case, the buffer is not updated.

Optionally, based on the foregoing embodiments, an adaptive parameter of a preset window function model may be further determined based on a coding parameter of the previous frame of the current frame. In this way, the adaptive parameter in the preset window function model of the current frame is adaptively adjusted, and accuracy of determining the adaptive window function is improved.

The coding parameter is used to indicate a type of a multi-channel signal of the previous frame of the current frame, or the coding parameter is used to indicate a type of a multi-channel signal of the previous frame of the current frame in which time-domain downmixing processing is performed, for example, an active frame or an inactive frame, unvoicing or voicing, periodic or aperiodic, transient or non-transient, or speech or music.

The adaptive parameter includes at least one of an upper limit value of a raised cosine width parameter, a lower limit value of the raised cosine width parameter, an upper limit value of a raised cosine height bias, a lower limit value of the raised cosine height bias, a smoothed inter-channel time difference estimation deviation corresponding to the upper limit value of the raised cosine width parameter, a smoothed inter-channel time difference estimation deviation corresponding to the lower limit value of the raised cosine width parameter, a smoothed inter-channel time difference estimation deviation corresponding to the upper limit value of the raised cosine height bias, and a smoothed inter-channel time difference estimation deviation corresponding to the lower limit value of the raised cosine height bias.

Optionally, when the audio coding device determines the adaptive window function in the first manner of determining the adaptive window function, the upper limit value of the raised cosine width parameter is the upper limit value of the first raised cosine width parameter, the lower limit value of the raised cosine width parameter is the lower limit value of the first raised cosine width parameter, the upper limit value of the raised cosine height bias is the upper limit value of the first raised cosine height bias, and the lower limit value of the raised cosine height bias is the lower limit value of the first raised cosine height bias. Correspondingly, the smoothed inter-channel time difference estimation deviation corresponding to the upper limit value of the raised cosine width parameter is the smoothed inter-channel time difference estimation deviation corresponding to the upper limit value of the first raised cosine width parameter, the smoothed inter-channel time difference estimation deviation corresponding to the lower limit value of the raised cosine width parameter is the smoothed inter-channel time difference estimation deviation corresponding to the lower limit value of the first raised cosine width parameter, the smoothed inter-channel time difference estimation deviation corresponding to the upper limit value of the raised cosine height bias is the smoothed inter-channel time difference estimation deviation corresponding to the upper limit value of the first raised cosine height bias, and the smoothed inter-channel time difference estimation deviation corresponding to the lower limit value of the raised cosine height bias is the smoothed inter-channel time difference estimation deviation corresponding to the lower limit value of the first raised cosine height bias.

Optionally, when the audio coding device determines the adaptive window function in the second manner of determining the adaptive window function, the upper limit value of the raised cosine width parameter is the upper limit value of the second raised cosine width parameter, the lower limit value of the raised cosine width parameter is the lower limit value of the second raised cosine width parameter, the upper limit value of the raised cosine height bias is the upper limit value of the second raised cosine height bias, and the lower limit value of the raised cosine height bias is the lower limit value of the second raised cosine height bias. Correspondingly, the smoothed inter-channel time difference estimation deviation corresponding to the upper limit value of the raised cosine width parameter is the smoothed inter-channel time difference estimation deviation corresponding to the upper limit value of the second raised cosine width parameter, the smoothed inter-channel time difference estimation deviation corresponding to the lower limit value of the raised cosine width parameter is the smoothed inter-channel time difference estimation deviation corresponding to the lower limit value of the second raised cosine width parameter, the smoothed inter-channel time difference estimation deviation corresponding to the upper limit value of the raised cosine height bias is the smoothed inter-channel time difference estimation deviation corresponding to the upper limit value of the second raised cosine height bias, and the smoothed inter-channel time difference estimation deviation corresponding to the lower limit value of the raised cosine height bias is the smoothed inter-channel time difference estimation deviation corresponding to the lower limit value of the second raised cosine height bias.

Optionally, in this embodiment, description is provided using an example in which the smoothed inter-channel time difference estimation deviation corresponding to the upper limit value of the raised cosine width parameter is equal to the smoothed inter-channel time difference estimation deviation corresponding to the upper limit value of the raised cosine height bias, and the smoothed inter-channel time difference estimation deviation corresponding to the lower limit value of the raised cosine width parameter is equal to the smoothed inter-channel time difference estimation deviation corresponding to the lower limit value of the raised cosine height bias.

Optionally, in this embodiment, description is provided using an example in which the coding parameter of the previous frame of the current frame is used to indicate unvoicing or voicing of the primary channel signal of the previous frame of the current frame and unvoicing or voicing of the secondary channel signal of the previous frame of the current frame.

(1) Determine the upper limit value of the raised cosine width parameter and the lower limit value of the raised cosine width parameter in the adaptive parameter based on the coding parameter of the previous frame of the current frame.

Unvoicing or voicing of the primary channel signal of the previous frame of the current frame and unvoicing or voicing of the secondary channel signal of the previous frame of the current frame are determined based on the coding parameter. If both the primary channel signal and the secondary channel signal are unvoiced, the upper limit value of the raised cosine width parameter is set to a first unvoicing parameter, and the lower limit value of the raised cosine width parameter is set to a second unvoicing parameter, that is, xh_width=xh_width_uv, and xl_width=xl_width_uv.

If both the primary channel signal and the secondary channel signal are voiced, the upper limit value of the raised cosine width parameter is set to a first voicing parameter, and the lower limit value of the raised cosine width parameter is set to a second voicing parameter, that is, xh_width=xh_width_v, and xl_width=xl_width_v.

If the primary channel signal is voiced, and the secondary channel signal is unvoiced, the upper limit value of the raised cosine width parameter is set to a third voicing parameter, and the lower limit value of the raised cosine width parameter is set to a fourth voicing parameter, that is, xh_width=xh_width_v2, and xl_width=xl_width_v2.

If the primary channel signal is unvoiced, and the secondary channel signal is voiced, the upper limit value of the raised cosine width parameter is set to a third unvoicing parameter, and the lower limit value of the raised cosine width parameter is set to a fourth unvoicing parameter, that is, xh_width=xh_width_uv2, and xl_width=xl_width_uv2.

The first unvoicing parameter xh_width_uv, the second unvoicing parameter xl_width_uv, the third unvoicing parameter xh_width_uv2, the fourth unvoicing parameter xl_width_uv2, the first voicing parameter xh_width_v, the second voicing parameter xl_width_v, the third voicing parameter xh_width_v2, and the fourth voicing parameter xl_width_v2 are all positive numbers, where xh_width_v<xh_width_v2<xh_width_uv2<xh_width_uv, and xl_width_uv<xl_width_uv2<xl_width_v2<xl_width_v.

Values of xh_width_v, xh_width_v2, xh_width_uv2, xh_width_uv, xl_width_uv, xl_width_uv2, xl_width_v2, and xl_width_v are not limited in this embodiment. For example, xh_width_v=0.2, xh_width_v2=0.25, xh_width_uv2=0.35, xh_width_uv=0.3, xl_width_uv=0.03, xl_width_uv2=0.02, xl_width_v2=0.04, and xl_width_v=0.05.

Optionally, at least one parameter of the first unvoicing parameter, the second unvoicing parameter, the third unvoicing parameter, the fourth unvoicing parameter, the first voicing parameter, the second voicing parameter, the third voicing parameter, and the fourth voicing parameter is adjusted using the coding parameter of the previous frame of the current frame.

For example, that the audio coding device adjusts at least one parameter of the first unvoicing parameter, the second unvoicing parameter, the third unvoicing parameter, the fourth unvoicing parameter, the first voicing parameter, the second voicing parameter, the third voicing parameter, and the fourth voicing parameter based on the coding parameter of a channel signal of the previous frame of the current frame is represented using the following formulas.

$$xh\_width\_uv=fach\_uv*xh\_width\_init;\quad xl\_width\_uv=fac1\_uv*xl\_width\_init;$$

$$xh\_width\_v=fach\_v*xh\_width\_init;\quad xl\_width\_v=fac1\_v*xl\_width\_init;$$

$$xh\_width\_v2=fach\_v2*xh\_width\_init;\quad xl\_width\_v2=fac1\_v2*xl\_width\_init;\text{ and}$$

$$xh\_width\_uv2=fach\_uv2*xh\_width\_init;\text{ and}\quad xl\_width\_uv2=fac1\_uv2*xl\_width\_init,$$

where fach_uv, fach_v, fach_v2, fach_uv2, xh_width_init, and xl_width_init are positive numbers determined based on the coding parameter.

In this embodiment, values of fach_uv, fach_v, fach_v2, fach_uv2, xh_width_init, and xl_width_init are not limited. For example, fach_uv=1.4, fach_v=0.8, fach_v2=1.0, fach_uv2=1.2, xh_width_init=0.25, and xl_width_init=0.04.

(2) Determine the upper limit value of the raised cosine height bias and the lower limit value of the raised cosine height bias in the adaptive parameter based on the coding parameter of the previous frame of the current frame.

Unvoicing or voicing of the primary channel signal of the previous frame of the current frame and unvoicing or voicing of the secondary channel signal of the previous frame of the current frame are determined based on the coding parameter. If both the primary channel signal and the secondary channel signal are the unvoiced, the upper limit value of the raised cosine height bias is set to a fifth unvoicing parameter, and the lower limit value of the raised cosine height bias is set to a sixth unvoicing parameter, that is, xh_bias=xh_bias_uv, and xl_bias=xl_bias_uv.

If both the primary channel signal and the secondary channel signal are voiced, the upper limit value of the raised cosine height bias is set to a fifth voicing parameter, and the lower limit value of the raised cosine height bias is set to a sixth voicing parameter, that is, xh_bias=xh_bias_v, and xl_bias=xl_bias_v.

If the primary channel signal is voiced, and the secondary channel signal is unvoiced, the upper limit value of the raised cosine height bias is set to a seventh voicing parameter, and the lower limit value of the raised cosine height bias is set to an eighth voicing parameter, that is, xh_bias=xh_bias_v2, and xl_bias=xl_bias_v2.

If the primary channel signal is unvoiced, and the secondary channel signal is voiced, the upper limit value of the raised cosine height bias is set to a seventh unvoicing parameter, and the lower limit value of the raised cosine height bias is set to an eighth unvoicing parameter, that is, xh_bias=xh_bias_uv2, and xl_bias=xl_bias_uv2.

The fifth unvoicing parameter xh_bias_uv, the sixth unvoicing parameter xl_bias_uv, the seventh unvoicing parameter xh_bias_uv2, the eighth unvoicing parameter xl_bias_uv2, the fifth voicing parameter xh_bias_v, the sixth voicing parameter xl_bias_v, the seventh voicing parameter xh_bias_v2, and the eighth voicing parameter xl_bias_v2 are all positive numbers, where xh_bias_v<xh_bias_v2<xh_bias_uv2<xh_bias_uv, xl_bias_v<xl_bias_v2<xl_bias_uv2<xl_bias_uv, xh_bias is the upper limit value of the raised cosine height bias, and xl_bias is the lower limit value of the raised cosine height bias.

In this embodiment, values of xh_bias_v, xh_bias_v2, xh_bias_uv2, xh_bias_uv, xl_bias_v, xl_bias_v2, xl_bias_uv2, and xl_bias_uv are not limited. For example, xh_bias_v=0.8, xl_bias_v=0.5, xh_bias_v2=0.7, xl_bias_v2=0.4, xh_bias_uv=0.6, xl_bias_uv=0.3, xh_bias_uv2=0.5, and xl_bias_uv2=0.2

Optionally, at least one of the fifth unvoicing parameter, the sixth unvoicing parameter, the seventh unvoicing parameter, the eighth unvoicing parameter, the fifth voicing parameter, the sixth voicing parameter, the seventh voicing parameter, and the eighth voicing parameter is adjusted based on the coding parameter of a channel signal of the previous frame of the current frame.

For example, the following formula is used for representation.

$$xh\_bias\_uv = fach\_uv' * xh\_bias\_init;$$
$$xl\_bias\_uv = fac1\_uv' * xl\_bias\_init;$$

$$xh\_bias\_v = fach\_v' * xh\_bias\_init;$$
$$xl\_bias\_v = fac1\_v' * xl\_bias\_init;$$

$$xh\_bias\_v2 = fach\_v2' * xh\_bias\_init;$$
$$xl\_bias\_v2 = fac1\_v2' * xl\_bias\_init;$$

$$xh\_bias\_uv2 = fach\_uv2' * xh\_bias\_init; \text{ and}$$
$$xl\_bias\_uv2 = fac1\_uv2' * xl\_bias\_init,$$

where fach_uv', fach_v', fach_v2', fach_uv2', xh_bias_init, and xl_bias_init are positive numbers determined based on the coding parameter.

In this embodiment, values of fach_uv', fach_v', fach_v2', fach_uv2', xh_bias_init, and xl_bias_init are not limited. For example, fach_v'=1.15, fach_v2'=1.0, fach_uv2'=0.85, fach_uv'=0.7, xh_bias_init=0.7, and xl_bias_init=0.4.

(3) Determine, based on the coding parameter of the previous frame of the current frame, the smoothed inter-channel time difference estimation deviation corresponding to the upper limit value of the raised cosine width parameter, and the smoothed inter-channel time difference estimation deviation corresponding to the lower limit value of the raised cosine width parameter in the adaptive parameter.

The unvoiced and voiced primary channel signals of the previous frame of the current frame and the unvoiced and voiced secondary channel signals of the previous frame of the current frame are determined based on the coding parameter. If both the primary channel signal and the secondary channel signal are unvoiced, the smoothed inter-channel time difference estimation deviation corresponding to the upper limit value of the raised cosine width parameter is set to a ninth unvoicing parameter, and the smoothed inter-channel time difference estimation deviation corresponding to the lower limit value of the raised cosine width parameter is set to a tenth unvoicing parameter, that is, yh_dist=yh_dist_uv, and yl_dist=yl_dist_uv.

If both the primary channel signal and the secondary channel signal are voiced, the smoothed inter-channel time difference estimation deviation corresponding to the upper limit value of the raised cosine width parameter is set to a ninth voicing parameter, and the smoothed inter-channel time difference estimation deviation corresponding to the lower limit value of the raised cosine width parameter is set to a tenth voicing parameter, that is, yh_dist=yh_dist_v, and yl_dist=yl_dist_v.

If the primary channel signal is voiced, and the secondary channel signal is unvoiced, the smoothed inter-channel time difference estimation deviation corresponding to the upper limit value of the raised cosine width parameter is set to an eleventh voicing parameter, and the smoothed inter-channel time difference estimation deviation corresponding to the lower limit value of the raised cosine width parameter is set to a twelfth voicing parameter, that is, yh_dist=yh_dist_v2, and yl_dist=yl_dist_v2.

If the primary channel signal is unvoiced, and the secondary channel signal is voiced, the smoothed inter-channel time difference estimation deviation corresponding to the upper limit value of the raised cosine width parameter is set to an eleventh unvoicing parameter, and the smoothed inter-channel time difference estimation deviation corresponding to the lower limit value of the raised cosine width parameter is set to a twelfth unvoicing parameter, that is, yh_dist=yh_dist_uv2, and yl_dist=yl_dist_uv2.

The ninth unvoicing parameter yh_dist_uv, the tenth unvoicing parameter yl_dist_uv, the eleventh unvoicing parameter yh_dist_uv2, the twelfth unvoicing parameter yl_dist_uv2, the ninth voicing parameter yh_dist_v, the tenth voicing parameter yl_dist_v, the eleventh voicing parameter yh_dist_v2, and the twelfth voicing parameter yl_dist_v2 are all positive numbers, where yh_dist_v<yh_dist_v2<yh_dist_uv2<yh_dist_uv, and yl_dist_uv<yl_dist_uv2<yl_dist_v2<yl_dist_v.

In this embodiment, values of yh_dist_v, yh_dist_v2, yh_dist_uv2, yh_dist_uv, yl_dist_uv, yl_dist_uv2, yl_dist_v2, and yl_dist_v are not limited.

Optionally, at least one parameter of the ninth unvoicing parameter, the tenth unvoicing parameter, the eleventh unvoicing parameter, the twelfth unvoicing parameter, the ninth voicing parameter, the tenth voicing parameter, the eleventh voicing parameter, and the twelfth voicing parameter is adjusted using the coding parameter of the previous frame of the current frame.

For example, the following formula is used for representation.

$$yh\_dist\_uv=fach\_uv''*yh\_dist\_init;$$
$$yl\_dist\_uv=fac1\_uv''*yl\_dist\_init;$$

$$yh\_dist\_v=fach\_v''*yh\_dist\_init;$$
$$yl\_dist\_v=fac1\_v''*yl\_dist\_init;$$

$$yh\_dist\_v2=fach\_v2''*yh\_dist\_init;$$
$$yl\_dist\_v2=fac1\_v2''*yl\_dist\_init;$$

$$yh\_dist\_uv2=fach\_uv2''*yh\_dist\_init;\text{ and}$$
$$yl\_dist\_uv2=fac1\_uv2''*yl\_dist\_init,$$

where fach_uv", fach_v", fach_v2", fach_uv2", yh_dist_init, and yl_dist_init are positive numbers determined based on the coding parameter, and values of the parameters are not limited in this embodiment.

In this embodiment, the adaptive parameter in the preset window function model is adjusted based on the coding parameter of the previous frame of the current frame such that an appropriate adaptive window function is determined adaptively based on the coding parameter of the previous frame of the current frame, thereby improving accuracy of generating an adaptive window function, and improving accuracy of estimating an inter-channel time difference.

Optionally, based on the foregoing embodiments, before step 301, time-domain preprocessing is performed on the multi-channel signal.

Optionally, the multi-channel signal of the current frame in this embodiment of this application is a multi-channel signal input to the audio coding device, or a multi-channel signal obtained through preprocessing after the multi-channel signal is input to the audio coding device.

Optionally, the multi-channel signal input to the audio coding device may be collected by a collection component in the audio coding device, or may be collected by a collection device independent of the audio coding device, and is sent to the audio coding device.

Optionally, the multi-channel signal input to the audio coding device is a multi-channel signal obtained after through analog-to-digital (A/D) conversion. Optionally, the multi-channel signal is a pulse code modulation (PCM) signal.

A sampling frequency of the multi-channel signal may be 8 kilohertz (kHz), 16 kHz, 32 kHz, 44.1 kHz, 48 kHz, or the like. This is not limited in this embodiment.

For example, the sampling frequency of the multi-channel signal is 16 kHz. In this case, duration of a frame of multi-channel signals is 20 milliseconds (ms), and a frame length is denoted as N, where N=320, in other words, the frame length is 320 sampling points. The multi-channel signal of the current frame includes a left channel signal and a right channel signal, the left channel signal is denoted as $x_L(n)$, and the right channel signal is denoted as $x_R(n)$, where n is a sampling point sequence number, and n=0, 1, 2, . . . , and (N−1).

Optionally, if high-pass filtering processing is performed on the current frame, a processed left channel signal is denoted as $x_{L\_HP}(n)$, and a processed right channel signal is denoted as $x_{R\_HP}(n)$, where n is a sampling point sequence number, and n=0, 1, 2, . . . , and (N−1).

Figure 11:
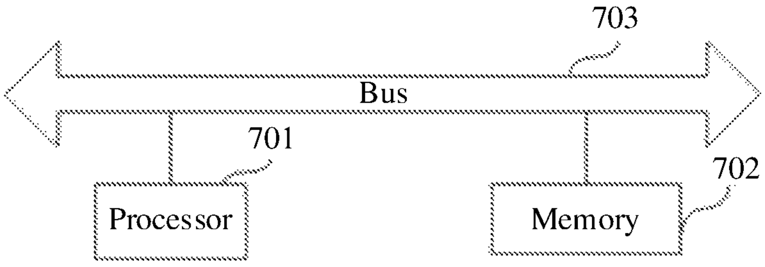
FIG. 11 is a schematic structural diagram of an audio coding device according to an example embodiment of this application.

FIG. 11 is a schematic structural diagram of an audio coding device according to an example embodiment of this application. In this embodiment of this application, the audio coding device may be an electronic device that has an audio collection and audio signal processing function, such as a mobile phone, a tablet computer, a laptop portable computer, a desktop computer, a speaker, a pen recorder, and a wearable device, or may be a network element that has an audio signal processing capability in a core network and a radio network. This is not limited in this embodiment.

The audio coding device includes a processor 701, a memory 702, and a bus 703.

The processor 701 includes one or more processing cores, and the processor 701 runs a software program and a module, to perform various function applications and process information.

The memory 702 is connected to the processor 701 using the bus 703. The memory 702 stores an instruction necessary for the audio coding device.

The processor 701 is configured to execute the instruction in the memory 702 to implement the delay estimation method provided in the method embodiments of this application.

In addition, the memory 702 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optic disc.

The memory 702 is further configured to buffer inter-channel time difference information of at least one past frame and/or a weighting coefficient of the at least one past frame.

Optionally, the audio coding device includes a collection component, and the collection component is configured to collect a multi-channel signal.

Optionally, the collection component includes at least one microphone. Each microphone is configured to collect one channel of channel signal.

Optionally, the audio coding device includes a receiving component, and the receiving component is configured to receive a multi-channel signal sent by another device.

Optionally, the audio coding device further has a decoding function.

It may be understood that FIG. 11 shows merely a simplified design of the audio coding device. In another embodiment, the audio coding device may include any quantity of transmitters, receivers, processors, controllers, memories, communications units, display units, play units, and the like. This is not limited in this embodiment.

Optionally, this application provides a computer readable storage medium. The computer readable storage medium stores an instruction. When the instruction is run on the audio coding device, the audio coding device is enabled to perform the delay estimation method provided in the foregoing embodiments.

Figure 12:
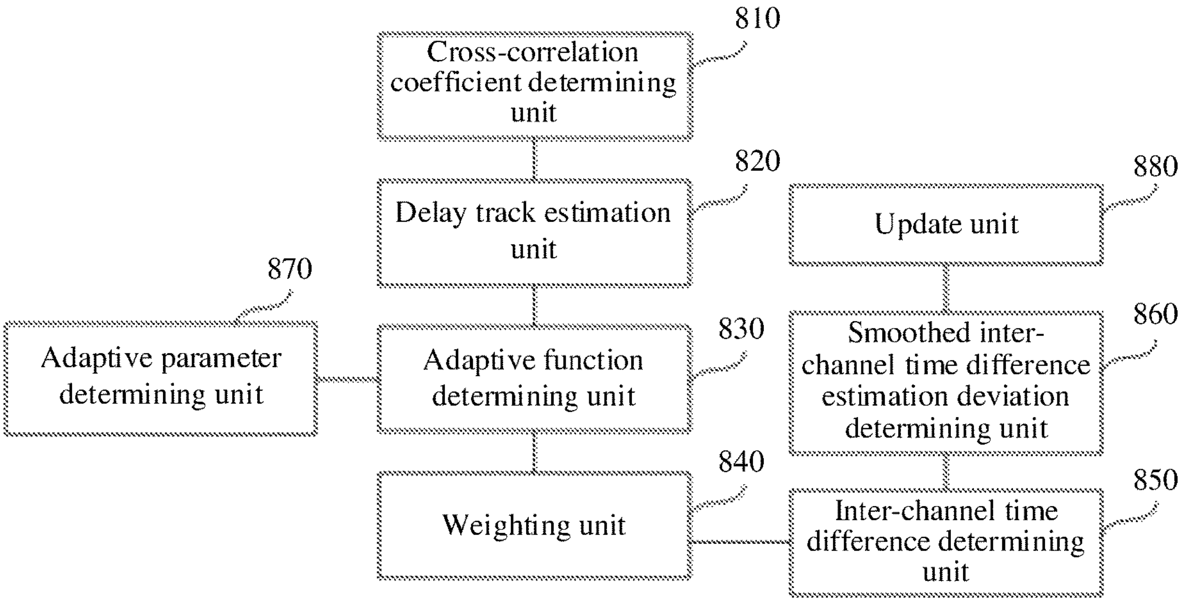
FIG. 12 is a block diagram of a delay estimation apparatus according to an embodiment of this application.

FIG. 12 is a block diagram of a delay estimation apparatus according to an embodiment of this application. The delay estimation apparatus may be implemented as all or a part of the audio coding device shown in FIG. 11 using software, hardware, or a combination thereof. The delay estimation apparatus may include a cross-correlation coefficient determining unit 810, a delay track estimation unit 820, an adaptive function determining unit 830, a weighting unit 840, and an inter-channel time difference determining unit 850.

The cross-correlation coefficient determining unit 810 is configured to determine a cross-correlation coefficient of a multi-channel signal of a current frame.

The delay track estimation unit 820 is configured to determine a delay track estimation value of the current frame based on buffered inter-channel time difference information of at least one past frame.

The adaptive function determining unit 830 is configured to determine an adaptive window function of the current frame.

The weighting unit 840 is configured to perform weighting on the cross-correlation coefficient based on the delay track estimation value of the current frame and the adaptive window function of the current frame, to obtain a weighted cross-correlation coefficient.

The inter-channel time difference determining unit 850 is configured to determine an inter-channel time difference of the current frame based on the weighted cross-correlation coefficient.

Optionally, the adaptive function determining unit 830 is further configured to calculate a first raised cosine width parameter based on a smoothed inter-channel time difference estimation deviation of a previous frame of the current frame, calculate a first raised cosine height bias based on the smoothed inter-channel time difference estimation deviation of the previous frame of the current frame, and determine the adaptive window function of the current frame based on the first raised cosine width parameter and the first raised cosine height bias.

Optionally, the apparatus further includes a smoothed inter-channel time difference estimation deviation determining unit 860.

The smoothed inter-channel time difference estimation deviation determining unit 860 is configured to calculate a smoothed inter-channel time difference estimation deviation of the current frame based on the smoothed inter-channel time difference estimation deviation of the previous frame of the current frame, the delay track estimation value of the current frame, and the inter-channel time difference of the current frame.

Optionally, the adaptive function determining unit 830 is further configured to determine an initial value of the inter-channel time difference of the current frame based on the cross-correlation coefficient, calculate an inter-channel time difference estimation deviation of the current frame based on the delay track estimation value of the current frame and the initial value of the inter-channel time difference of the current frame, and determine the adaptive window function of the current frame based on the inter-channel time difference estimation deviation of the current frame.

Optionally, the adaptive function determining unit 830 is further configured to calculate a second raised cosine width parameter based on the inter-channel time difference estimation deviation of the current frame, calculate a second raised cosine height bias based on the inter-channel time difference estimation deviation of the current frame, and determine the adaptive window function of the current frame based on the second raised cosine width parameter and the second raised cosine height bias.

Optionally, the apparatus further includes an adaptive parameter determining unit 870.

The adaptive parameter determining unit 870 is configured to determine an adaptive parameter of the adaptive window function of the current frame based on a coding parameter of the previous frame of the current frame.

Optionally, the delay track estimation unit 820 is further configured to perform delay track estimation based on the buffered inter-channel time difference information of the at least one past frame using a linear regression method, to determine the delay track estimation value of the current frame.

Optionally, the delay track estimation unit 820 is further configured to perform delay track estimation based on the buffered inter-channel time difference information of the at least one past frame using a weighted linear regression method, to determine the delay track estimation value of the current frame.

Optionally, the apparatus further includes an update unit 880.

The update unit 880 is configured to update the buffered inter-channel time difference information of the at least one past frame.

Optionally, the buffered inter-channel time difference information of the at least one past frame is an inter-channel time difference smoothed value of the at least one past frame, and the update unit 880 is configured to determine an inter-channel time difference smoothed value of the current frame based on the delay track estimation value of the current frame and the inter-channel time difference of the current frame, and update a buffered inter-channel time difference smoothed value of the at least one past frame based on the inter-channel time difference smoothed value of the current frame.

Optionally, the update unit 880 is further configured to determine, based on a voice activation detection result of the previous frame of the current frame or a voice activation detection result of the current frame, whether to update the buffered inter-channel time difference information of the at least one past frame.

Optionally, the update unit 880 is further configured to update a buffered weighting coefficient of the at least one past frame, where the weighting coefficient of the at least one past frame is a coefficient in the weighted linear regression method.

Optionally, when the adaptive window function of the current frame is determined based on a smoothed inter-channel time difference of the previous frame of the current frame, the update unit 880 is further configured to calculate a first weighting coefficient of the current frame based on the smoothed inter-channel time difference estimation deviation of the current frame, and update a buffered first weighting coefficient of the at least one past frame based on the first weighting coefficient of the current frame.

Optionally, when the adaptive window function of the current frame is determined based on the smoothed inter-channel time difference estimation deviation of the current frame, the update unit 880 is further configured to calculate a second weighting coefficient of the current frame based on the inter-channel time difference estimation deviation of the current frame, and update a buffered second weighting coefficient of the at least one past frame based on the second weighting coefficient of the current frame.

Optionally, the update unit 880 is further configured to, when the voice activation detection result of the previous frame of the current frame is an active frame or the voice activation detection result of the current frame is an active frame, update the buffered weighting coefficient of the at least one past frame.

For related details, refer to the foregoing method embodiments.

Optionally, the foregoing units may be implemented by a processor in the audio coding device by executing an instruction in a memory.

It may be clearly understood by a person of ordinary skill in the art that, for ease and brief description, for a detailed working process of the foregoing apparatus and units, refer to a corresponding process in the foregoing method embodiments, and details are not described herein again.

In the embodiments provided in the present application, it should be understood that the disclosed apparatus and method may be implemented in other manners. For example, the described apparatus embodiments are merely examples. For example, the unit division may merely be logical function division and may be other division in an embodiment. For example, a plurality of units or components may be combined or integrated into another system, or some features may be ignored or not performed.

The foregoing descriptions are merely optional implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A delay estimation method, comprising:

obtaining a cross-correlation coefficient of a multi-channel signal of a current frame;

obtaining a delay track estimation value of the current frame based on buffered inter-channel time difference information of a past frame;

obtaining an adaptive window function of the current frame;

performing weighting on the cross-correlation coefficient to obtain a weighted cross-correlation coefficient based on the delay track estimation value of the current frame and the adaptive window function of the current frame; and obtaining an inter-channel time difference of the current frame based on the weighted cross-correlation coefficient.

2. The delay estimation method of claim 1, wherein obtaining the adaptive window function of the current frame comprises:

calculating a first raised cosine width parameter based on a smoothed inter-channel time difference estimation deviation of a previous frame of the current frame;

calculating a first raised cosine height bias based on the smoothed inter-channel time difference estimation deviation of the previous frame; and obtaining the adaptive window function of the current frame based on the first raised cosine width parameter and the first raised cosine height bias.

3. The delay estimation method of claim 2, comprising further calculating the first raised cosine width parameter using the following formulas:

$$\text{win\_width1}=\text{TRUNC}(\text{width\_par1}*(A*L\_\text{NCSHIFT}\_DS+1)),\text{ and}$$

$$\text{width\_par1}=a\_\text{width1}*\text{smooth\_dist\_reg}+b\_\text{width1},$$

wherein a_width1=(xh_width1−xl_width1)/(yh_dist1−yl_dist1) and b_width1=xh_width1−a_width1*yh_dist1, wherein win_width1 is the first raised cosine width parameter, wherein TRUNC indicates rounding a value, wherein L_NCSHIFT_DS is a maximum value of an absolute value of the inter-channel time difference, wherein A is a preset constant and is greater than or equal to 4, wherein xh_width1 is an upper limit value of the first raised cosine width parameter, wherein xl_width1 is a lower limit value of the first raised cosine width parameter, wherein yh_dist1 is a smoothed inter-channel time difference estimation deviation corresponding to the upper limit value of the first raised cosine width parameter, wherein yl_dist1 is a smoothed inter-channel time difference estimation deviation corresponding to the lower limit value of the first raised cosine width parameter, wherein smooth_dist_reg is the smoothed inter-channel time difference estimation deviation of the previous frame, and wherein xh_width1, xl_width1, yh_dist1, and yl_dist1 are all positive numbers.

4. The delay estimation method of claim 3, comprising further calculating width earl using the following formulas:

$$\text{width\_par1}=\min(\text{width\_par1},xh\_\text{width1}),\text{ and}$$

$$\text{width\_par1}=\max(\text{width\_par1},xl\_\text{width1}),$$

wherein min represents taking of a minimum value, and wherein max represents taking of a maximum value.

5. The delay estimation method of claim 3, comprising further calculating win_bias1 using the following formula:

$$\text{win\_bias1}=a\_\text{bias1}*\text{smooth\_dist\_reg}+b\_\text{bias1},$$

wherein a_bias1=(xh_bias1−xl_bias1)/(yh_dist2−yl_dist2) and b_bias1=xh_bias1−a_bias1*yh_dist2, wherein win_bias1 is the first raised cosine height bias, wherein xh_bias1 is an upper limit value of the first raised cosine height bias, wherein xl_bias1 is a lower limit value of the first raised cosine height bias, wherein yh_dist2 is a smoothed inter-channel time difference estimation deviation corresponding to the upper limit value of the first raised cosine height bias, wherein yl_dist2 is a smoothed inter-channel time difference estimation deviation corresponding to the lower limit value of the first raised cosine height bias, wherein smooth_dist_reg is the smoothed inter-channel time difference estimation deviation of the previous frame, and wherein yh_dist2, yl_dist2, xh_bias1, and xl_bias1 are all positive numbers.

6. The delay estimation method of claim 5, comprising further calculating win_bias1 using the following formulas:

$$\text{win\_bias1}=\min(\text{win\_bias1},xh\_\text{bias1}),\text{ and}$$

$$\text{win\_bias1}=\max(\text{win\_bias1},xl\_\text{bias1}),$$

wherein min represents taking of a minimum value, and wherein max represents taking of a maximum value.

7. The delay estimation method of claim 1, comprising further calculating loc_weight_win using the following formulas:

$$\text{loc\_weight\_win}(k)=\text{win\_bias1 when }0\le k\le\text{TRUNC}(A*L\_\text{NCSHIFT}\_DS/2)-2*\text{win\_width1}-1,$$

$$\text{loc\_weight\_win}(k)=0.5*(1+\text{win\_bias1})+0.5*(1-\text{win\_bias1})*\cos(\pi*(k-\text{TRUNC}(A*L\_\text{NCSHIFT}\_DS/2))/(2*\text{win\_width1}))\text{ when TRUNC}(A*L\_\text{NCSHIFT}\_DS/2)-2*\text{win\_width1}\le k\le\text{TRUNC}(A*L\_\text{NCSHIFT}\_DS/2)+2*\text{win\_width1}-1;\text{ and}$$

$$\text{loc\_weight\_win}(k)=\text{win\_bias1 when TRUNC}(A*L\_\text{NCSHIFT}\_DS/2)+2*\text{win\_width1}\le k\le A*L\_\text{NCSHIFT}\_DS,$$

wherein loc_weight_win(k) represents the adaptive window function, wherein k=0, 1, . . . , A*L_NCSHIFT_DS, wherein A is a preset constant and is greater than or equal to 4, wherein L_NCSHIFT_DS is a maximum value of an absolute value of the inter-channel time difference, wherein win_width1 is a first raised cosine width parameter, and wherein win_bias1 is a first raised cosine height bias.

8. The delay estimation method of claim 2, wherein after obtaining the inter-channel time difference of the current frame based on the weighted cross-correlation coefficient, the delay estimation method further comprises:

calculating a smoothed inter-channel time difference estimation deviation of the current frame based on the smoothed inter-channel time difference estimation deviation of the previous frame, the delay track estimation value of the current frame, and the inter-channel time difference of the current frame, calculating the smoothed inter-channel time difference estimation deviation of the current frame using the following formulas:

$$\text{smooth\_dist\_reg\_update}=(1-\gamma)*\text{smooth\_dist\_reg}+\gamma*\text{dist\_reg}', \text{ and}$$

$$\text{dist\_reg}'=|\text{reg\_prv\_corr}-\text{cur\_itd}|,$$

wherein smooth_dist_reg_update is the smoothed inter-channel time difference estimation deviation of the current frame, wherein γ is a first smoothing factor and 0<γ<1, wherein smooth_dist_reg is the smoothed inter-channel time difference estimation deviation of the previous frame, wherein reg_prv_corr is the delay track estimation value of the current frame, and wherein cur_itd is the inter-channel time difference of the current frame.

9. The delay estimation method of claim 1, wherein obtaining the adaptive window function of the current frame comprises:

obtaining an initial value of the inter-channel time difference of the current frame based on the cross-correlation coefficient;

calculating an inter-channel time difference estimation deviation of the current frame based on the delay track estimation value of the current frame and the initial value of the inter-channel time difference of the current frame using the following formula:

$$\text{dist\_reg}=|\text{reg\_prv\_corr}-\text{cur\_itd}|,$$

wherein dist_reg is the inter-channel time difference estimation deviation of the current frame, wherein reg_prv_corr is the delay track estimation value of the current frame, and wherein cur_itd_init is the initial value of the inter-channel time difference of the current frame; and obtaining the adaptive window function of the current frame based on the inter-channel time difference estimation deviation of the current frame.

10. The delay estimation method of claim 9, wherein obtaining the adaptive window function of the current frame based on the inter-channel time difference estimation deviation of the current frame comprises:

calculating a second raised cosine width parameter based on the inter-channel time difference estimation deviation of the current frame;

calculating a second raised cosine height bias based on the inter-channel time difference estimation deviation of the current frame; and obtaining the adaptive window function of the current frame based on the second raised cosine width parameter and the second raised cosine height bias.

11. The delay estimation method of claim 1, comprising further calculating weighted cross-correlation coefficient using the following formula:

$$c\_\text{weight}(x)=c(x)*\text{loc\_weight\_win}(x-\text{TRUNC}(\text{reg\_prv\_corr})+\text{TRUNC}(A*L\_\text{NCSHIFT\_}DS/2)-L\_\text{NCSHIFT\_}DS),$$

wherein c_weight(x) is the weighted cross-correlation coefficient, wherein c(x) is the cross-correlation coefficient, wherein loc_weight_win is the adaptive window function of the current frame, wherein TRUNC indicates rounding a value, wherein reg_prv_corr is the delay track estimation value of the current frame, wherein x is an integer greater than or equal to zero and less than or equal to 2*L_NCSHIFT_DS, and wherein L_NCSHIFT_DS is a maximum value of an absolute value of the inter-channel time difference.

12. An audio coding device comprising:

a processor; and a memory coupled to the processor and storing instructions that, when executed by the processor, cause the audio coding device to be configured to:

obtain a cross-correlation coefficient of a multi-channel signal of a current frame;

obtain a delay track estimation value of the current frame based on buffered inter-channel time difference information of a past frame;

obtain an adaptive window function of the current frame;

perform weighting on the cross-correlation coefficient to obtain a weighted cross-correlation coefficient based on the delay track estimation value of the current frame and the adaptive window function of the current frame; and obtain an inter-channel time difference of the current frame based on the weighted cross-correlation coefficient.

13. The audio coding device of claim 12, wherein to obtain the adaptive window function of the current frame, the instructions further cause the processor to be configured to:

calculate a first raised cosine width parameter based on a smoothed inter-channel time difference estimation deviation of a previous frame of the current frame;

calculate a first raised cosine height bias based on the smoothed inter-channel time difference estimation deviation of the previous frame; and obtain the adaptive window function of the current frame based on the first raised cosine width parameter and the first raised cosine height bias.

14. The audio coding device of claim 13, comprising further calculating the first raised cosine width parameter is using the following formulas:

$$\text{win\_width1}=\text{TRUNC}(\text{width\_par1}*(A*L\_\text{NCSHIFT\_}DS+1)), \text{ and}$$

$$\text{width\_par1}=a\_\text{width1}*\text{smooth\_dist\_reg}+b\_\text{width1},$$

wherein a_width1=(xh_width1−xl_width1)/(yh_dist1−yl_dist1) and b_width1=xh_width1−a_width1*yh_dist1, wherein win_width1 is the first raised cosine width parameter, wherein TRUNC indicates rounding a value, wherein L_NCSHIFT_DS is a maximum value of an absolute value of an inter-channel time difference, wherein A is a preset constant and is greater than or equal to 4, wherein xh_width1 is an upper limit value of the first raised cosine width parameter, wherein xl_width1 is a lower limit value of the first raised cosine width parameter, wherein yh_dist1 is a smoothed inter-channel time difference estimation deviation corresponding to the upper limit value of the first raised cosine width parameter, wherein yl_dist1 is a smoothed inter-channel time difference estimation deviation corresponding to the lower limit value of the first raised cosine width parameter, wherein smooth_dist_reg is the smoothed inter-channel time difference estimation deviation of the previous frame, and wherein xh_width1, xl_width1, yh_dist1, and yl_dist1 are all positive numbers.

15. The audio coding device of claim 14, comprising further calculating width_par1 using the following formulas:

$$\text{width\_par1}=\min(\text{width\_par1},xh\_\text{width1}),\ \text{and}$$

$$\text{width\_par1}=\max(\text{width\_par1},xl\_\text{width1}),$$

wherein min represents taking of a minimum value, and wherein max represents taking of a maximum value.

16. The audio coding device of claim 14, comprising further calculating the first raised cosine height bias using the following formula:

$$\text{win\_bias1}=a\_\text{bias1}*\text{smooth\_dist\_reg}+b\_\text{bias1},$$

wherein a_bias1=(xh_bias1−xl_bias1)/(yh_dist2−yl_dist2) and b_bias1=xh_bias1−a_bias1*yh_dist2, wherein win_bias1 is the first raised cosine height bias, wherein xh_bias1 is an upper limit value of the first raised cosine height bias, wherein xl_bias1 is a lower limit value of the first raised cosine height bias, wherein yh_dist2 is a smoothed inter-channel time difference estimation deviation corresponding to the upper limit value of the first raised cosine height bias, wherein yl_dist2 is a smoothed inter-channel time difference estimation deviation corresponding to the lower limit value of the first raised cosine height bias, wherein smooth_dist_reg is the smoothed inter-channel time difference estimation deviation of the previous frame, and wherein yh_dist2, yl_dist2, xh_bias1, and xl_bias1 are all positive numbers.

17. The audio coding device of claim 16, comprising further calculating win_bias1 using the following formulas:

$$\text{win\_bias1}=\min(\text{win\_bias1},xh\_\text{bias1}),\ \text{and}$$

$$\text{win\_bias1}=\max(\text{win\_bias1},xl\_\text{bias1}),$$

wherein min represents taking of a minimum value, and wherein max represents taking of a maximum value.

18. The audio coding device of claim 12, further calculating the adaptive window function using the following formulas:

$$\text{loc\_weight\_win}(k)=\text{win\_bias1 when } 0\leq k\leq \text{TRUNC}(A*L\_\text{NCSHIFT}\_DS/2)-2*\text{win\_width1}-1,$$

$$\text{loc\_weight\_win}(k)=0.5*(1+\text{win\_bias1})+0.5*(1-\text{win\_bias1})*\cos(\pi*(k-\text{TRUNC}(A*L\_\text{NCSHIFT}\_DS/2))/(2*\text{win\_width1}))\text{ when TRUNC}(A*L\_\text{NCSHIFT}\_DS/2)-2*\text{win\_width1}\leq k\leq \text{TRUNC}(A*L\_\text{NCSHIFT}\_DS/2)+2*\text{win\_width1}-1;\ \text{and}$$

$$\text{loc\_weight\_win}(k)=\text{win\_bias1 when TRUNC}(A*L\_\text{NCSHIFT}\_DS/2)+2*\text{win\_width1}\leq k\leq A*L\_\text{NCSHIFT}\_DS,$$

wherein loc_weight_win(k) represents the adaptive window function, wherein k=0, 1, . . . , A*L_NCSHIFT_DS, wherein A is a preset constant and is greater than or equal to 4, wherein L_NCSHIFT_DS is a maximum value of an absolute value of the inter-channel time difference, wherein win_width1 is a first raised cosine width parameter, and wherein win_bias1 is a first raised cosine height bias.

19. The audio coding device of claim 13, wherein the instructions further cause the processor to be configured to:

calculate a smoothed inter-channel time difference estimation deviation of the current frame based on the smoothed inter-channel time difference estimation deviation of the previous frame, the delay track estimation value of the current frame, and the inter-channel time difference of the current frame; and calculate the smoothed inter-channel time difference estimation deviation of the current frame using the following formulas:

$$\text{smooth\_dist\_reg\_update}=(1-\gamma)*\text{smooth\_dist\_reg}+\gamma*\text{dist\_reg}',\ \text{and}$$

$$\text{dist\_reg}'=|\text{reg\_prv\_corr}-\text{cur\_itd}|,$$

wherein smooth_dist_reg_update is the smoothed inter-channel time difference estimation deviation of the current frame, wherein γ is a first smoothing factor, and 0<γ<1, wherein smooth_dist_reg is the smoothed inter-channel time difference estimation deviation of the previous frame, wherein reg_prv_corr is the delay track estimation value of the current frame, and wherein cur_itd is the inter-channel time difference of the current frame.

20. The audio coding device of claim 12, further configured to calculate the weighted cross-correlation coefficient using the following formula:

$$c\_\text{weight}(x)=c(x)*\text{loc\_weight\_win}(x-\text{TRUNC}(\text{reg\_prv\_corr})+\text{TRUNC}(A*L\_\text{NCSHIFT}\_DS/2)-L\_\text{NCSHIFT}\_DS),$$

wherein c_weight(x) is the weighted cross-correlation coefficient, wherein c(x) is the cross-correlation coefficient, wherein loc_weight_win is the adaptive window function of the current frame, wherein TRUNC indicates rounding a value, wherein reg_prv_corr is the delay track estimation value of the current frame, wherein x is an integer greater than or equal to zero and less than or equal to 2*L_NCSHIFT_DS, and wherein L_NCSHIFT_DS is a maximum value of an absolute value of the inter-channel time difference.

21. The audio coding device of claim 12, wherein to obtain the delay track estimation value of the current frame based on buffered inter-channel time difference information of the past frame, the instructions further cause the processor to be configured to perform delay track estimation to obtain the delay track estimation value of the current frame based on the buffered inter-channel time difference information of the past frame using a linear regression method.

22. The audio coding device of claim 12, wherein to obtain the delay track estimation value of the current frame based on buffered inter-channel time difference information of the past frame, the instructions further cause the processor to be configured to perform delay track estimation to obtain the delay track estimation value of the current frame based on the buffered inter-channel time difference information of the past frame using a weighted linear regression method.

* * * * *